Aug. 11, 1959  E. R. LUTZ ET AL  2,898,817
AUTOMATIC MACHINE FOR MAKING AND CLOSING DYNAMITE
SHELL CARTRIDGES AND CASINGS
AND SIMILAR APPARATUS
Filed June 15, 1956  24 Sheets-Sheet 1
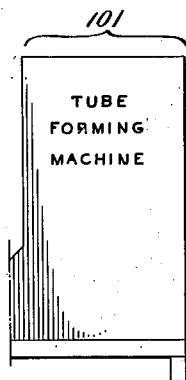
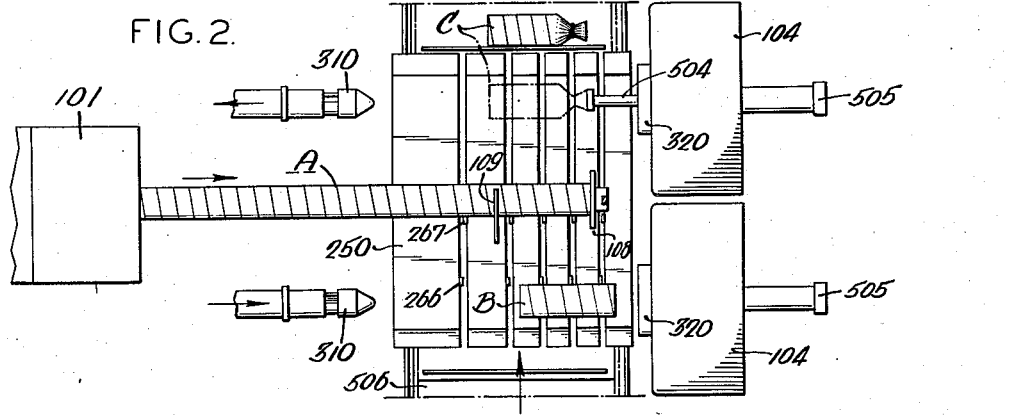
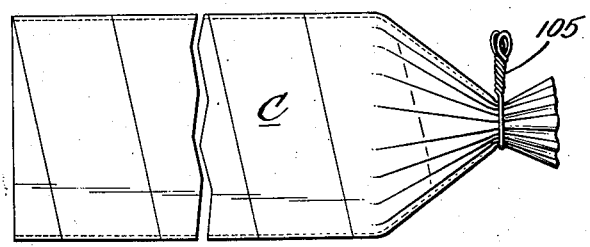
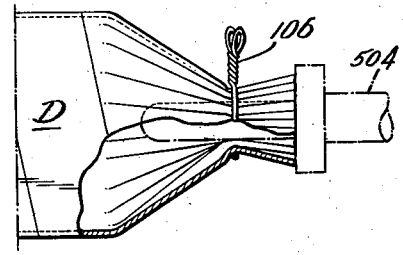
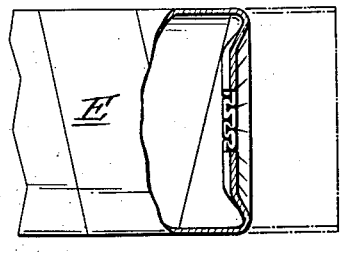
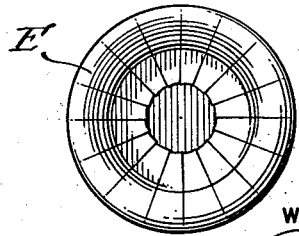
INVENTORS:
EARLE R. LUTZ
WILBUR L. SHEFFIELD
BY 
ATTY.

Aug. 11, 1959     E. R. LUTZ ET AL     2,898,817
AUTOMATIC MACHINE FOR MAKING AND CLOSING DYNAMITE
SHELL CARTRIDGES AND CASINGS
AND SIMILAR APPARATUS
Filed June 15, 1956     24 Sheets-Sheet 2
INVENTORS:
EARLE R. LUTZ
WILBUR L. SHEFFIELD
BY 
ATTY.

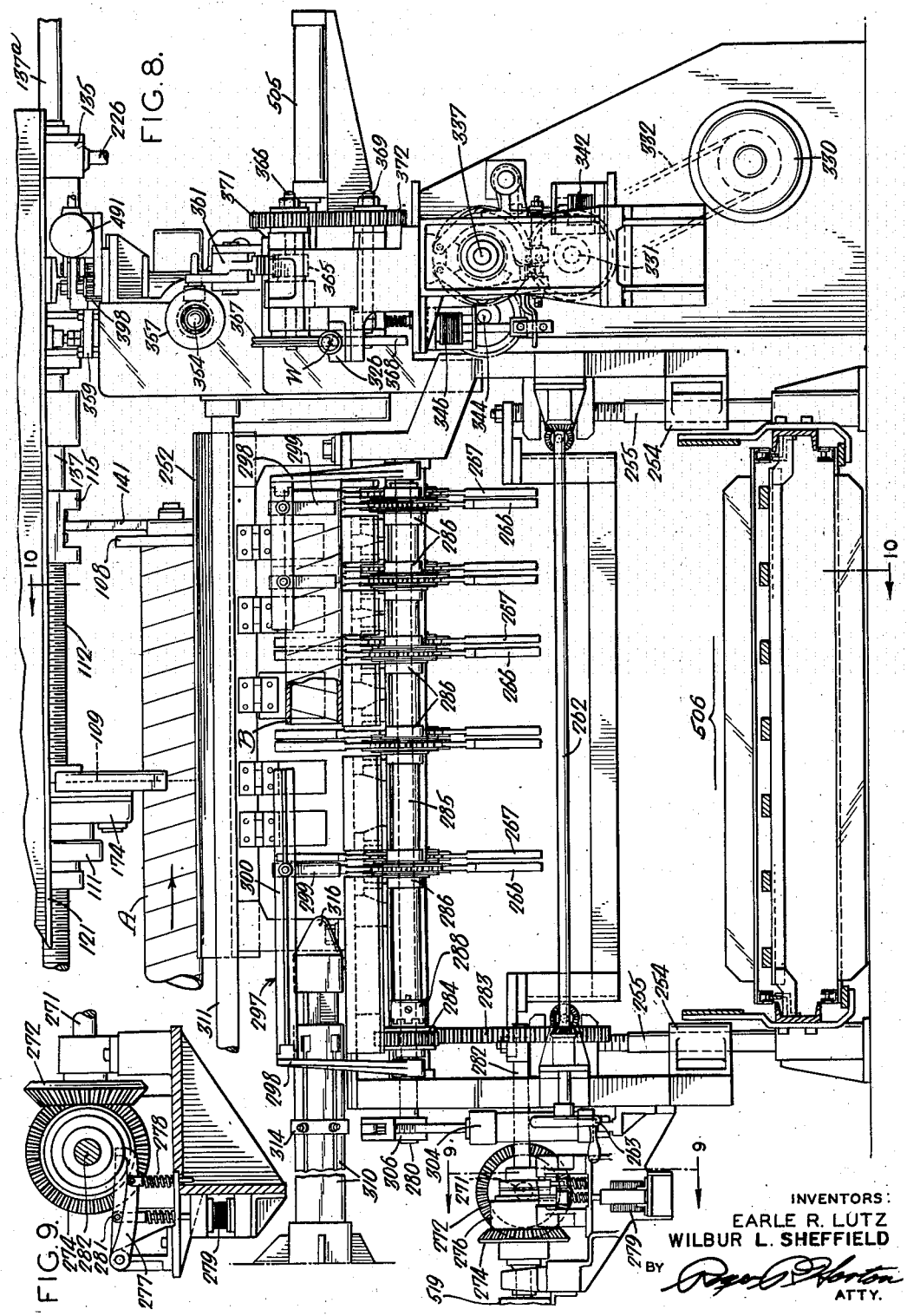

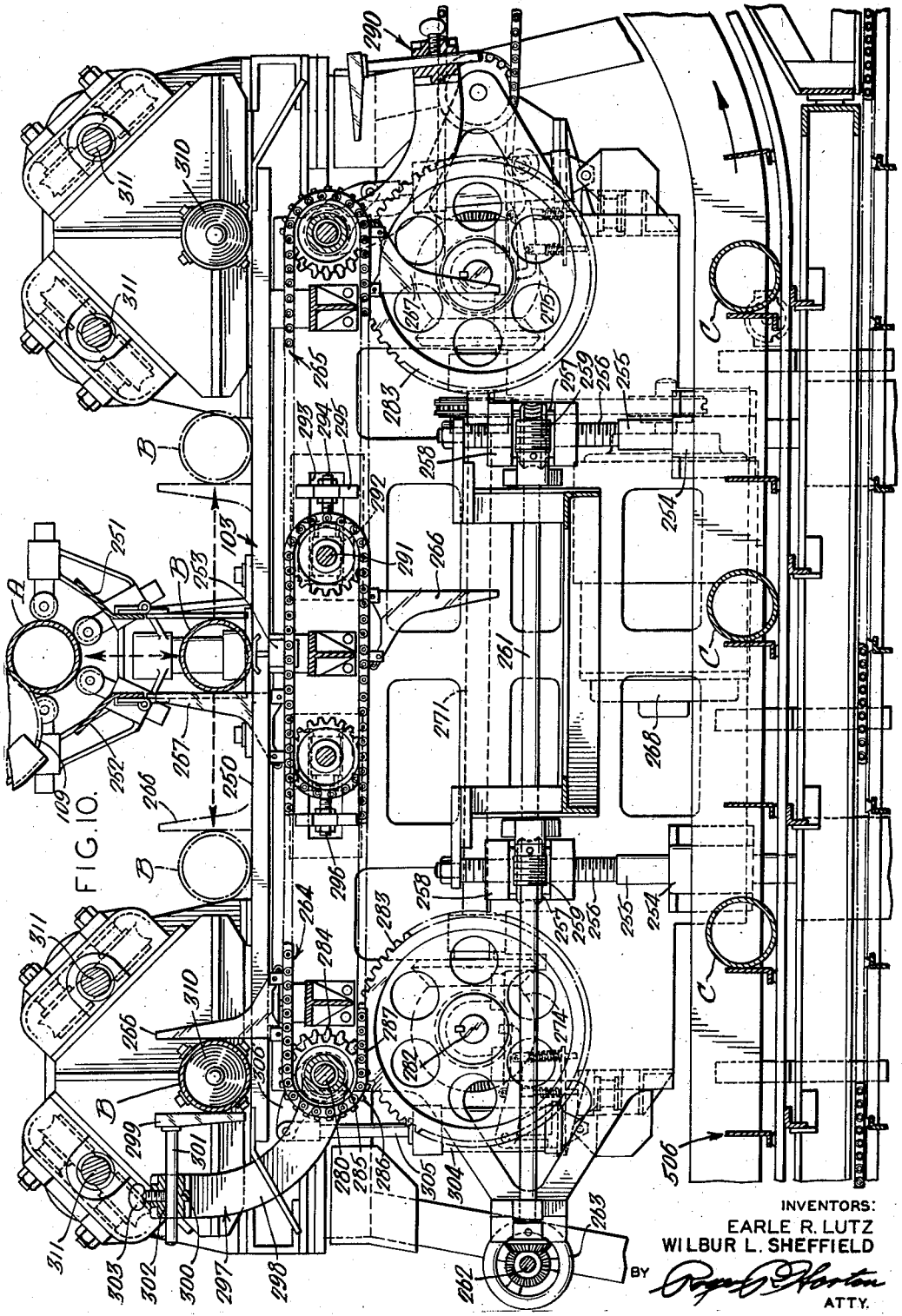

Aug. 11, 1959  E. R. LUTZ ET AL  2,898,817
AUTOMATIC MACHINE FOR MAKING AND CLOSING DYNAMITE
SHELL CARTRIDGES AND CASINGS
AND SIMILAR APPARATUS
Filed June 15, 1956  24 Sheets-Sheet 5
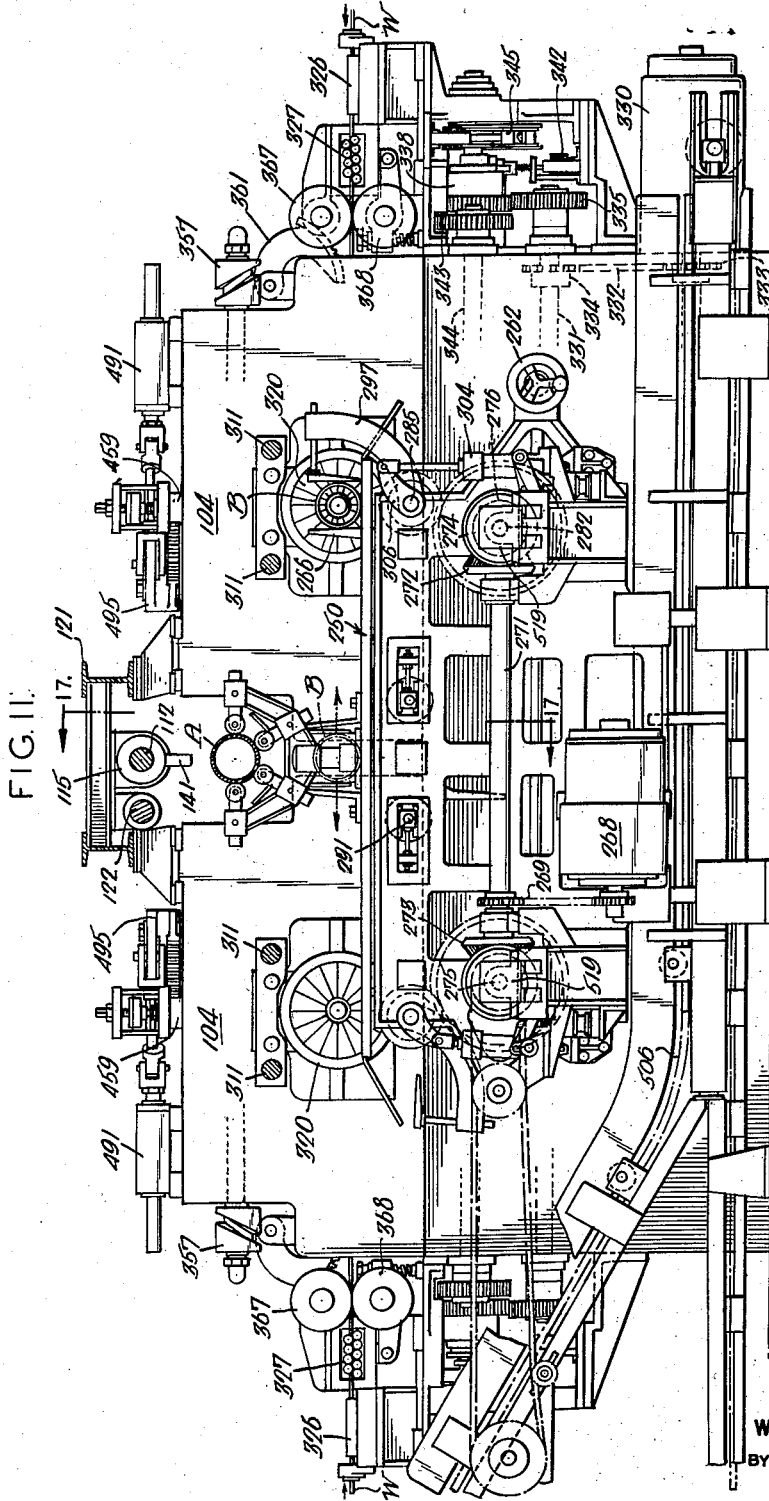
INVENTORS
EARLE R. LUTZ
WILBUR L. SHEFFIELD
ATTY.

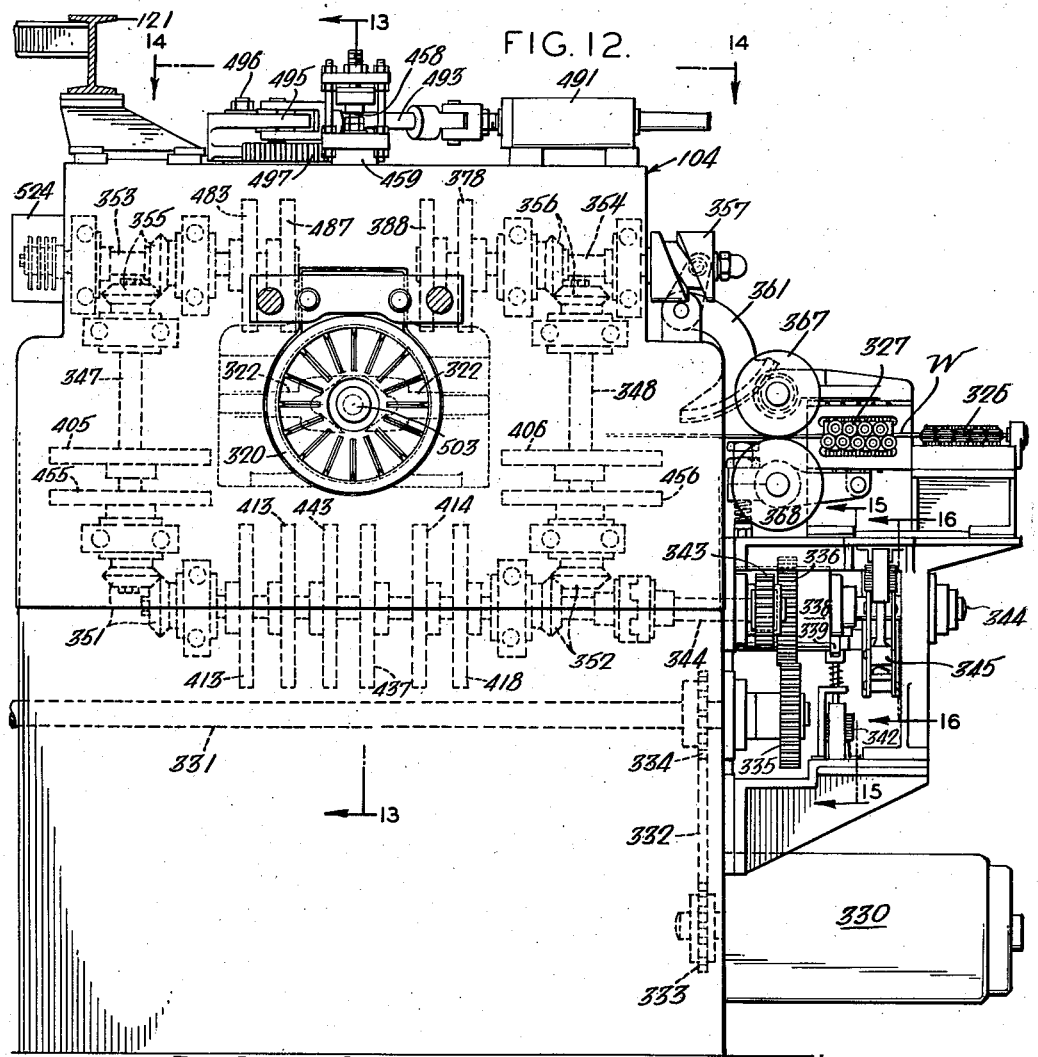

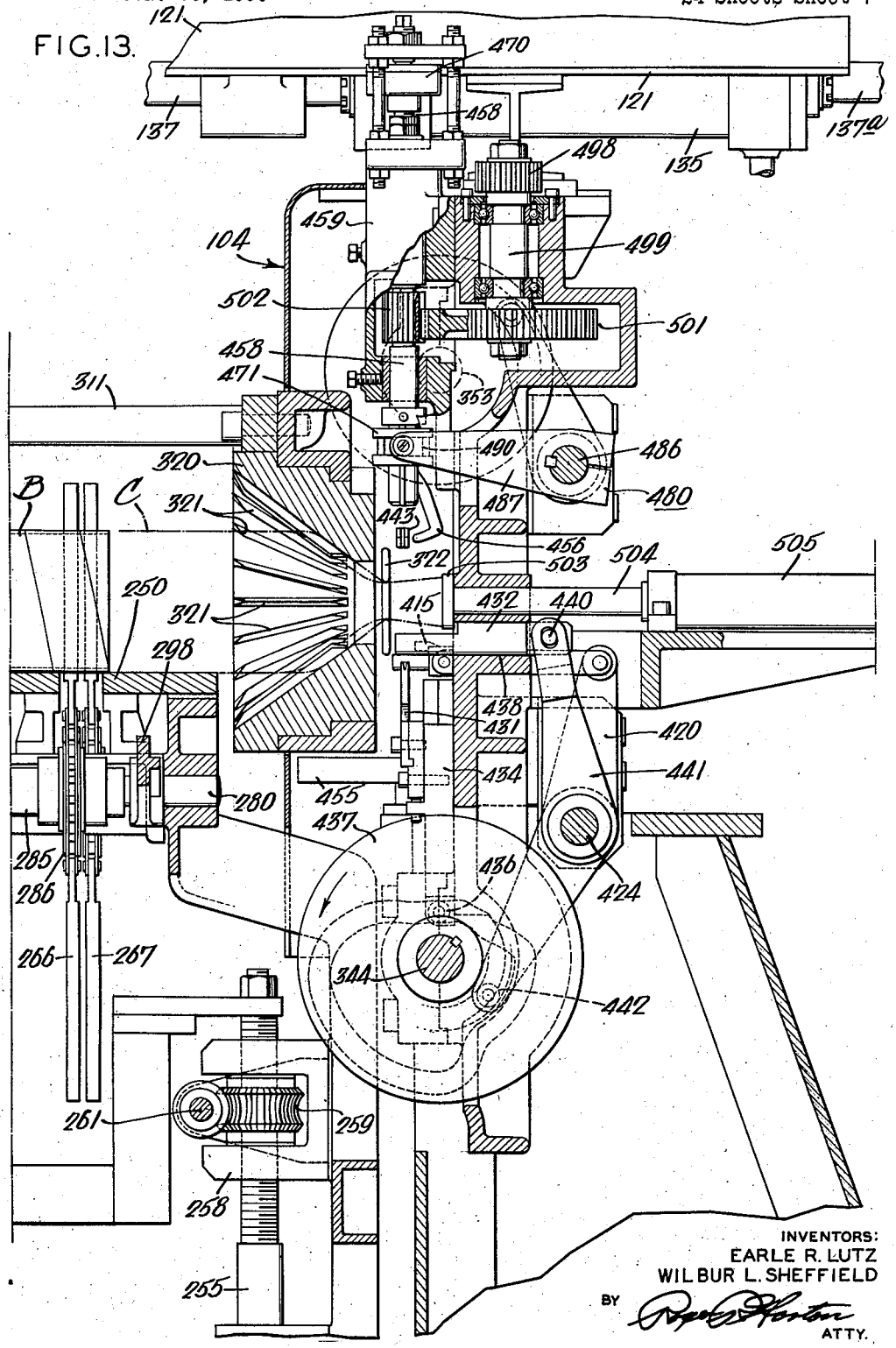

Aug. 11, 1959

E. R. LUTZ ET AL 2,898,817

AUTOMATIC MACHINE FOR MAKING AND CLOSING DYNAMITE
SHELL CARTRIDGES AND CASINGS
AND SIMILAR APPARATUS

Filed June 15, 1956

INVENTORS:
EARLE R. LUTZ
WILBUR L. SHEFFIELD

BY

ATTY.

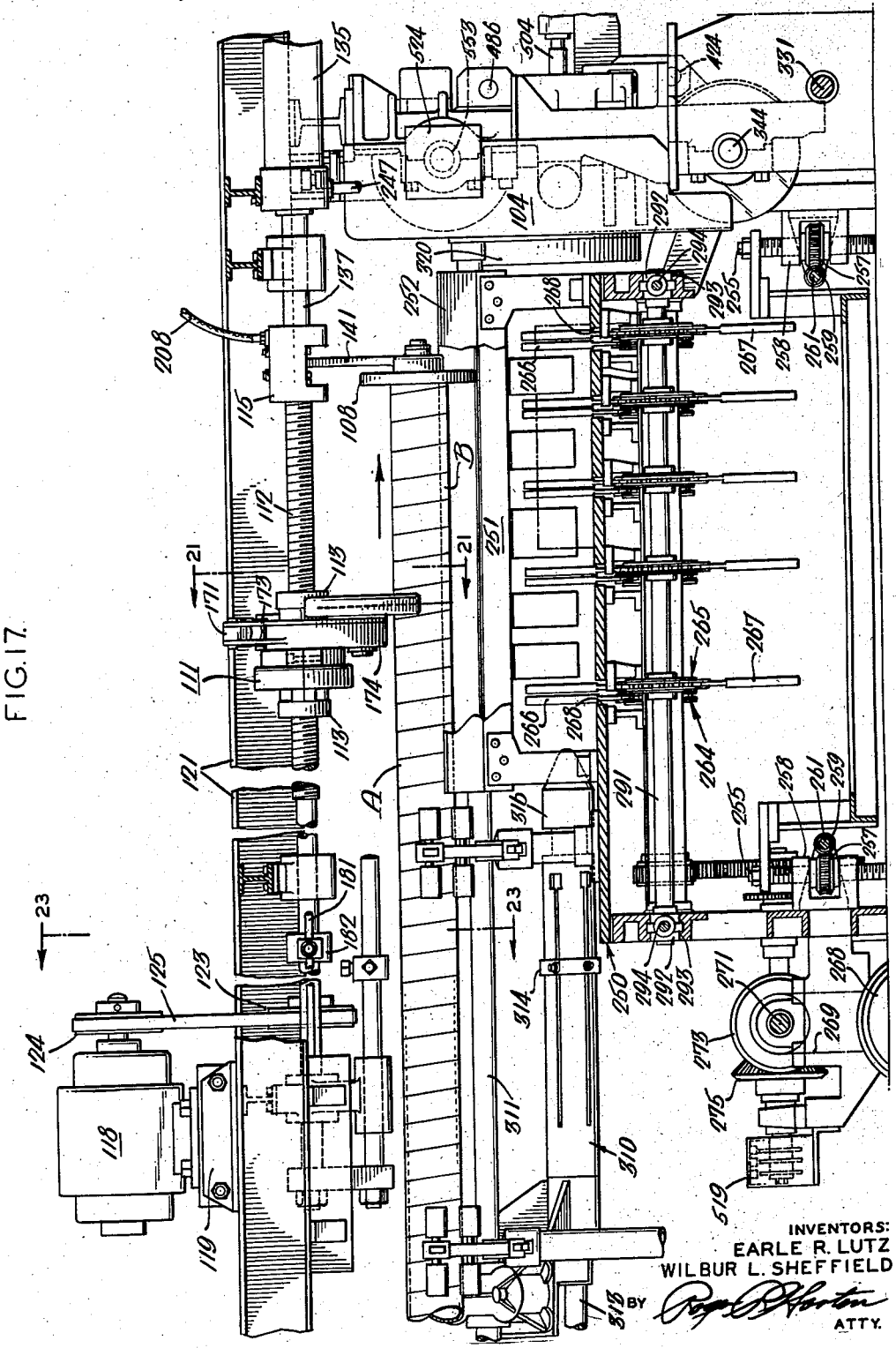

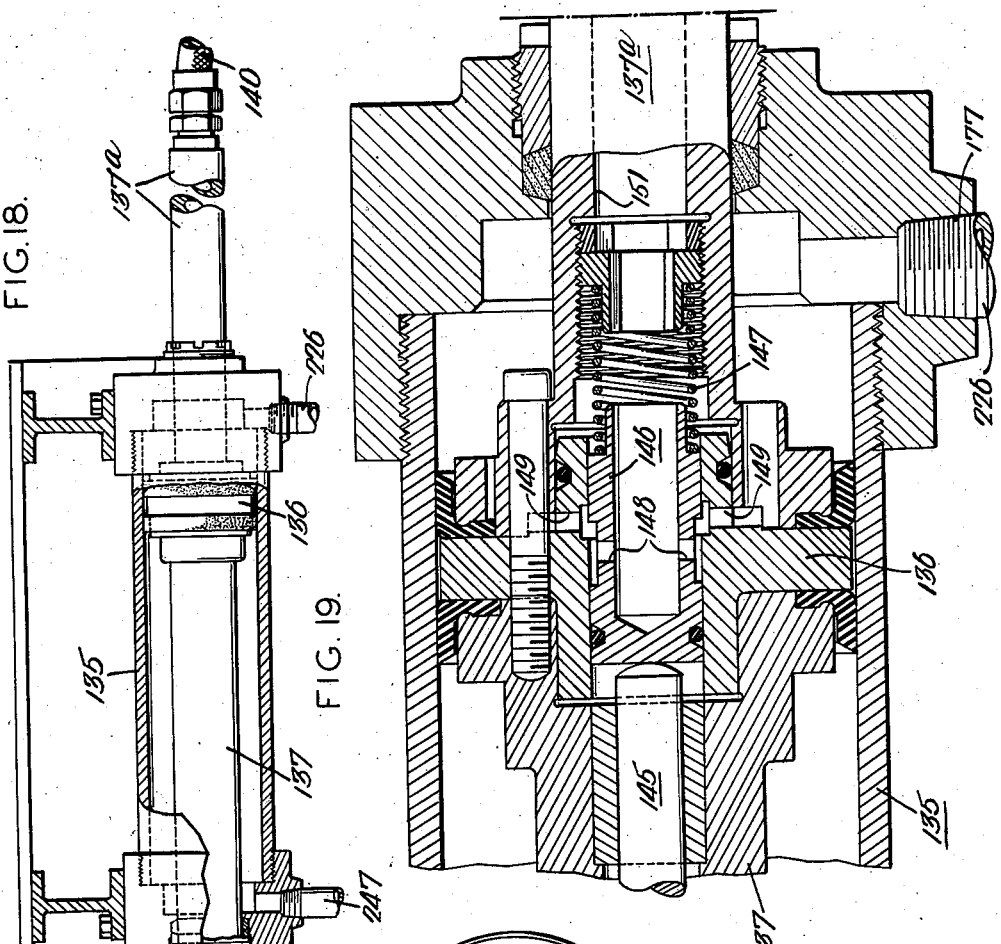

INVENTORS:
EARLE R. LUTZ
WILBUR L. SHEFFIELD
ATTY.

Aug. 11, 1959 E. R. LUTZ ET AL 2,898,817
AUTOMATIC MACHINE FOR MAKING AND CLOSING DYNAMITE
SHELL CARTRIDGES AND CASINGS
AND SIMILAR APPARATUS
Filed June 15, 1956 24 Sheets-Sheet 12

INVENTORS:
EARLE R. LUTZ
WILBUR L. SHEFFIELD
BY
ATTY.

Aug. 11, 1959 E. R. LUTZ ET AL 2,898,817
AUTOMATIC MACHINE FOR MAKING AND CLOSING DYNAMITE
SHELL CARTRIDGES AND CASINGS
AND SIMILAR APPARATUS
Filed June 15, 1956 24 Sheets-Sheet 13
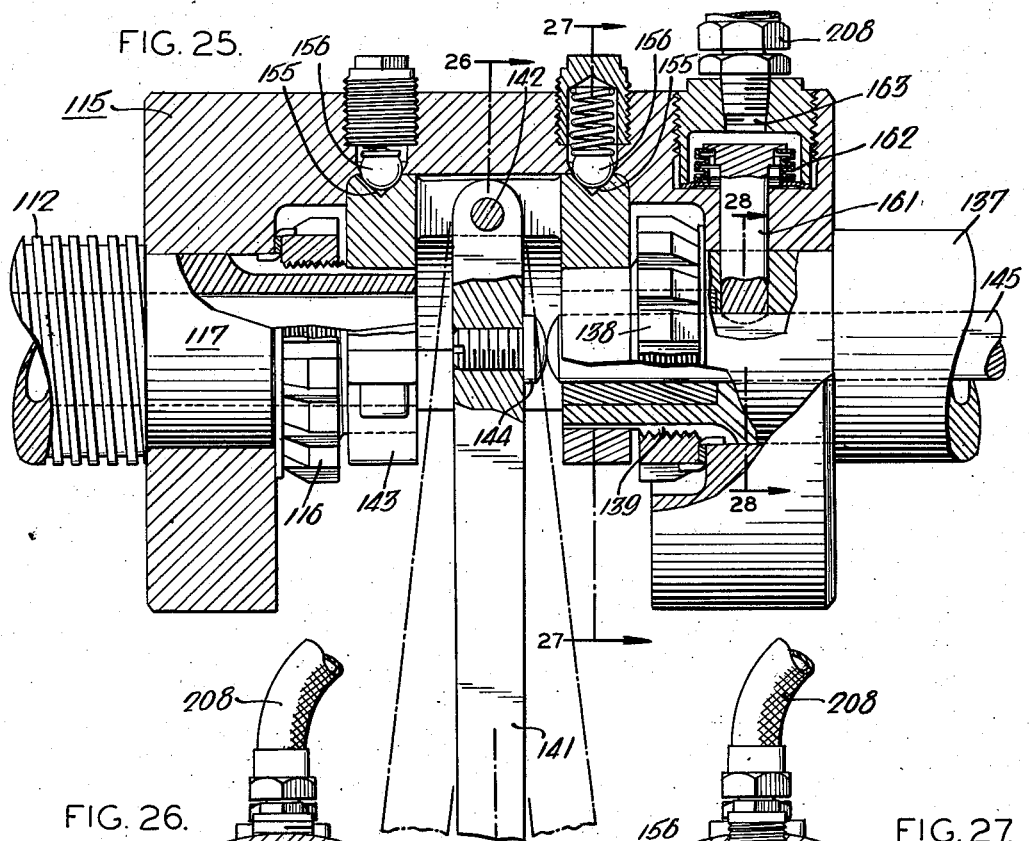
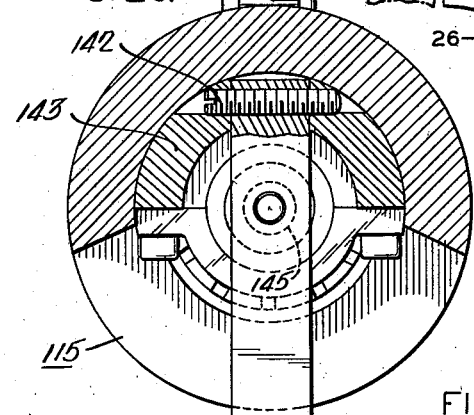
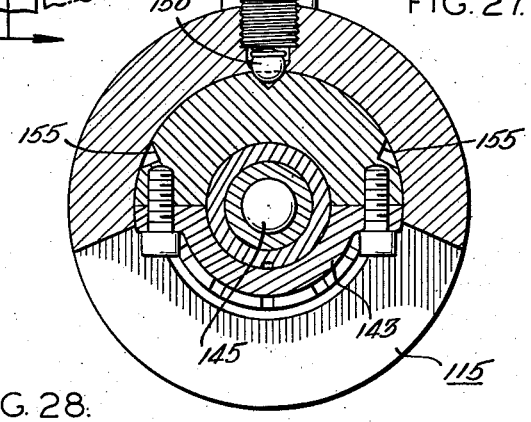
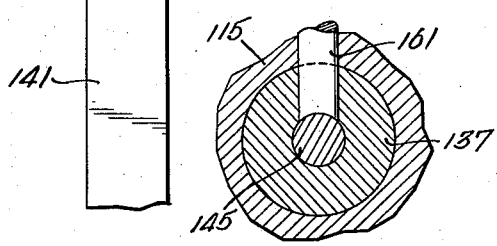
INVENTORS:
EARLE R. LUTZ
WILBUR L. SHEFFIELD
BY
ATTY.

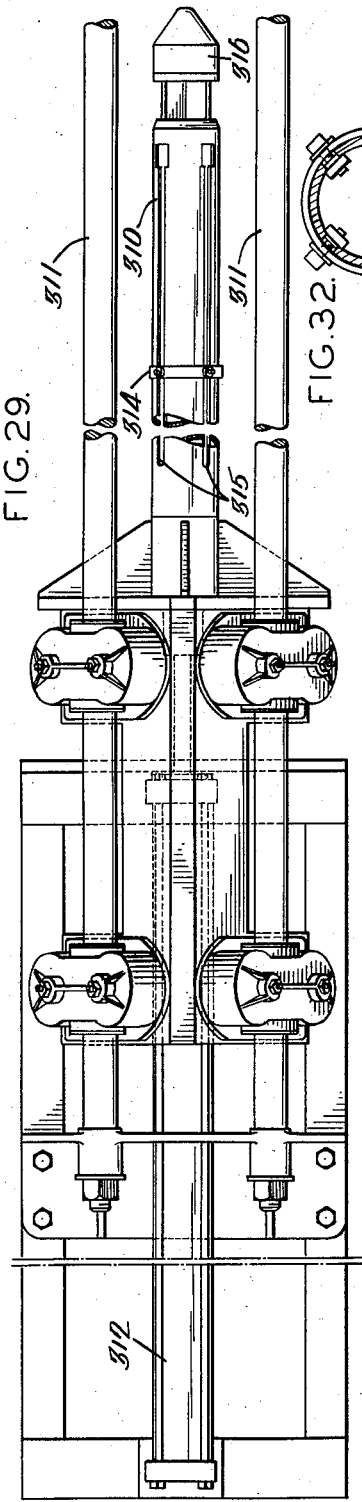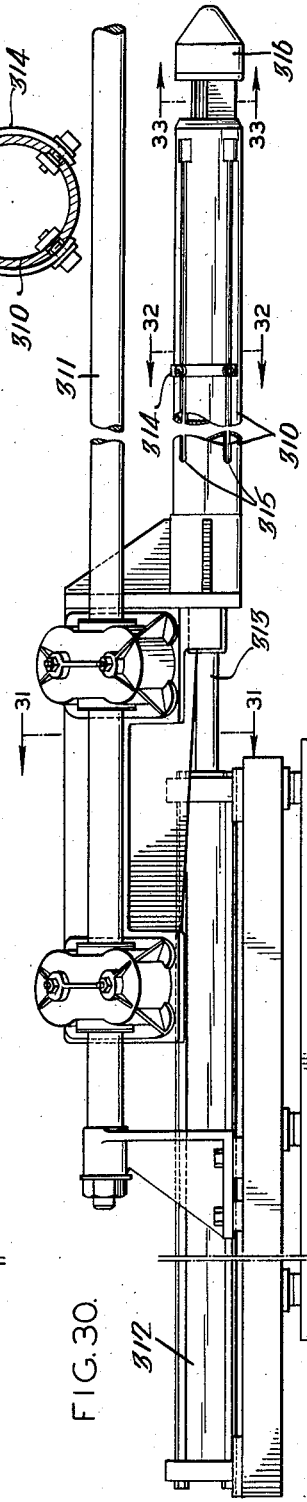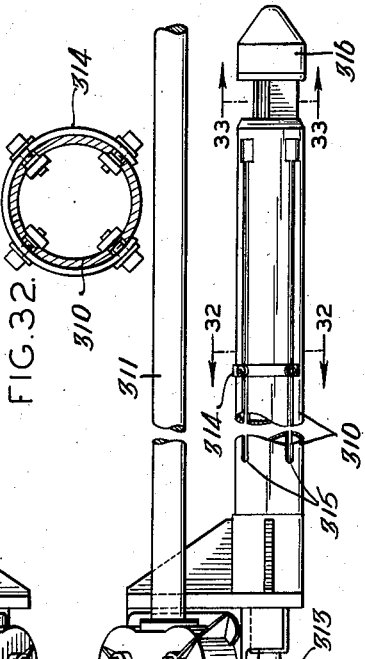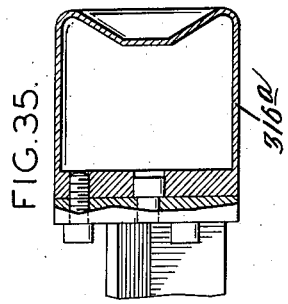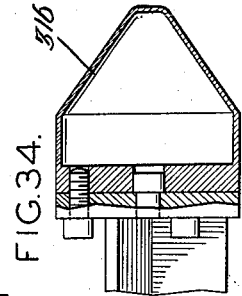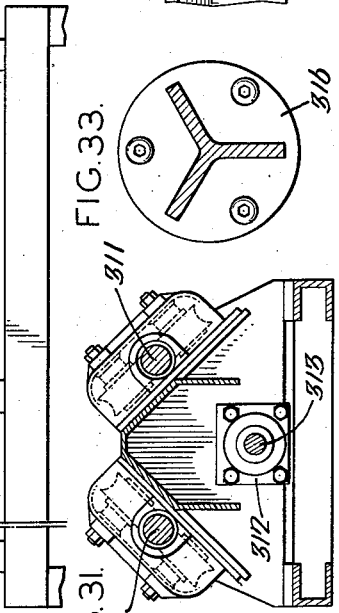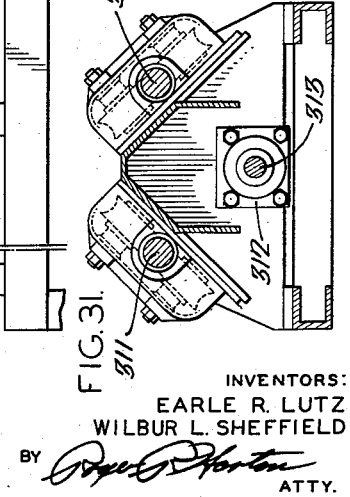

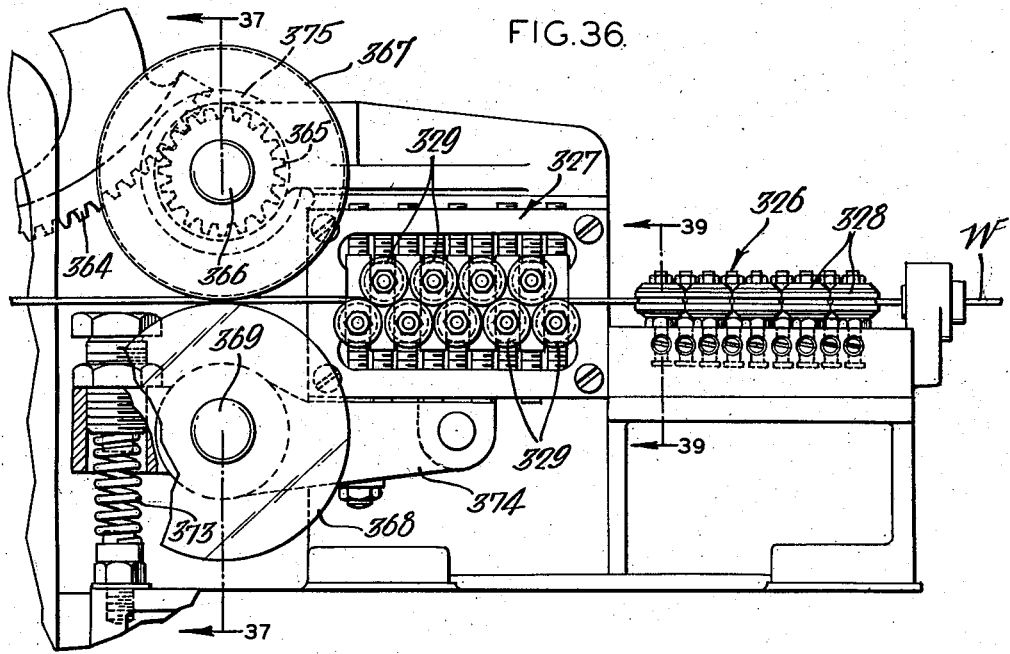
FIG. 36.
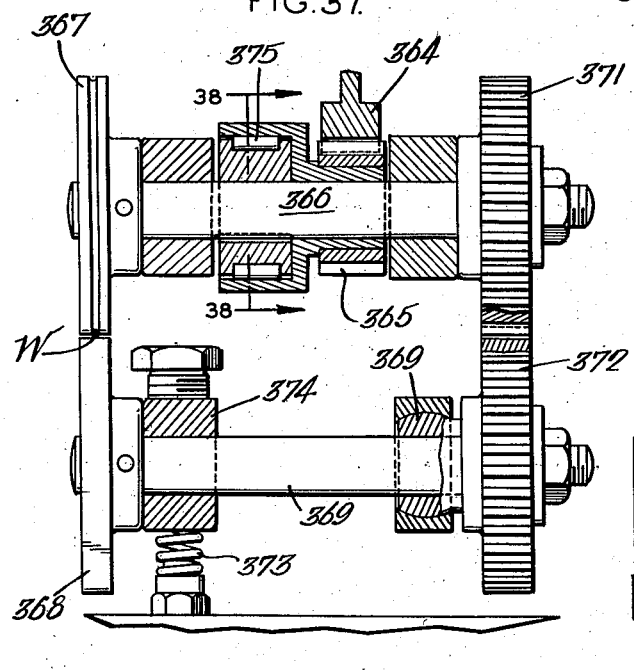
FIG. 37.
FIG. 38.
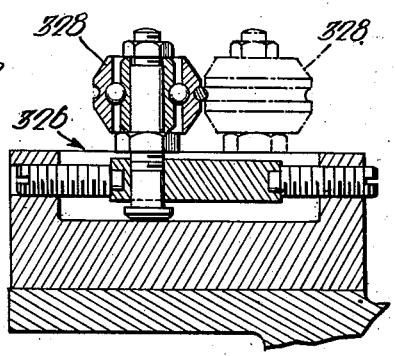
FIG. 39.
INVENTORS:
EARLE R. LUTZ
WILBUR L. SHEFFIELD
BY 
ATTY.

INVENTORS:
EARLE R. LUTZ
WILBUR L. SHEFFIELD

ATTY.

Aug. 11, 1959 E. R. LUTZ ET AL 2,898,817
AUTOMATIC MACHINE FOR MAKING AND CLOSING DYNAMITE
SHELL CARTRIDGES AND CASINGS
AND SIMILAR APPARATUS
Filed June 15, 1956 24 Sheets-Sheet 17

INVENTORS:
EARLE R. LUTZ
WILBUR L. SHEFFIELD
BY
ATTY.

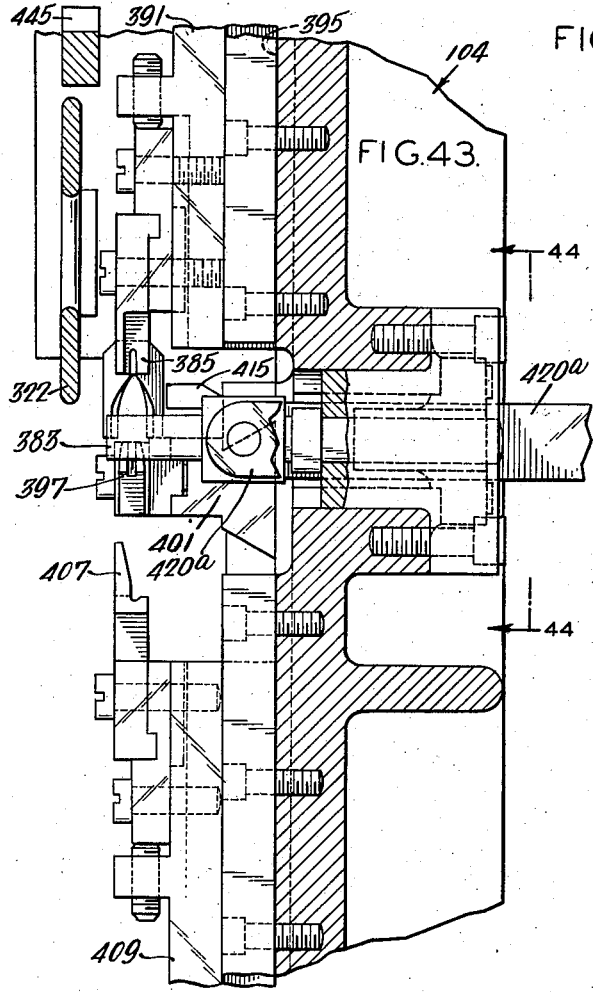
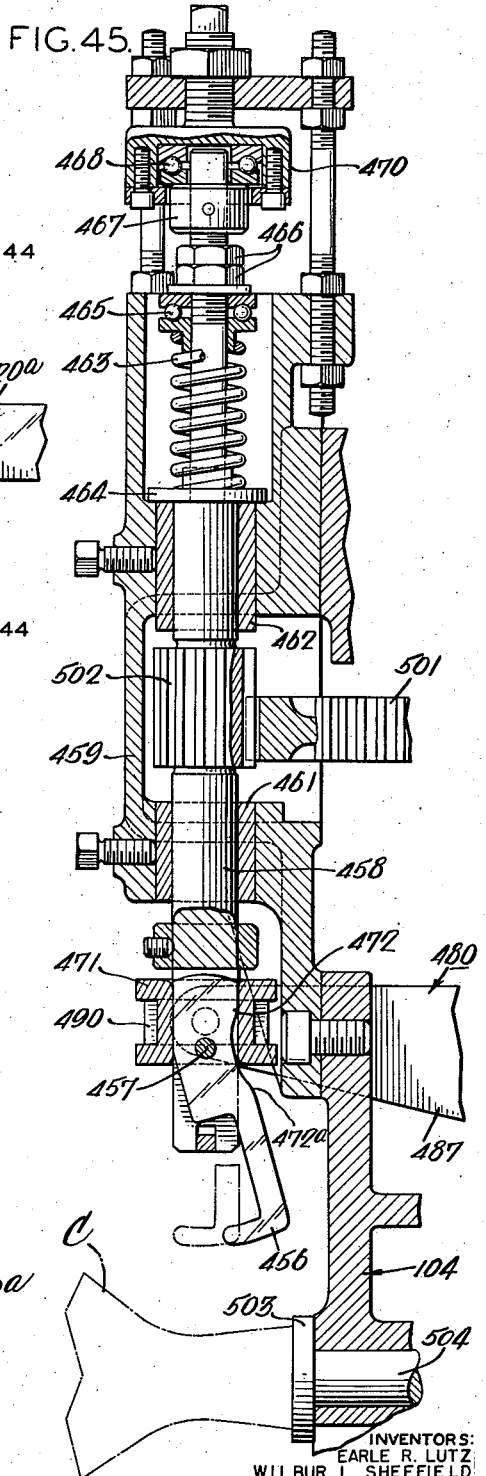
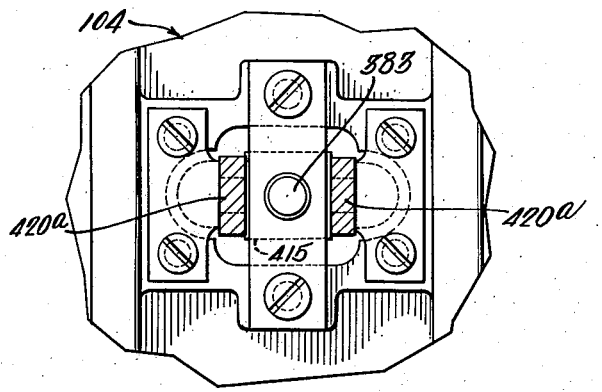

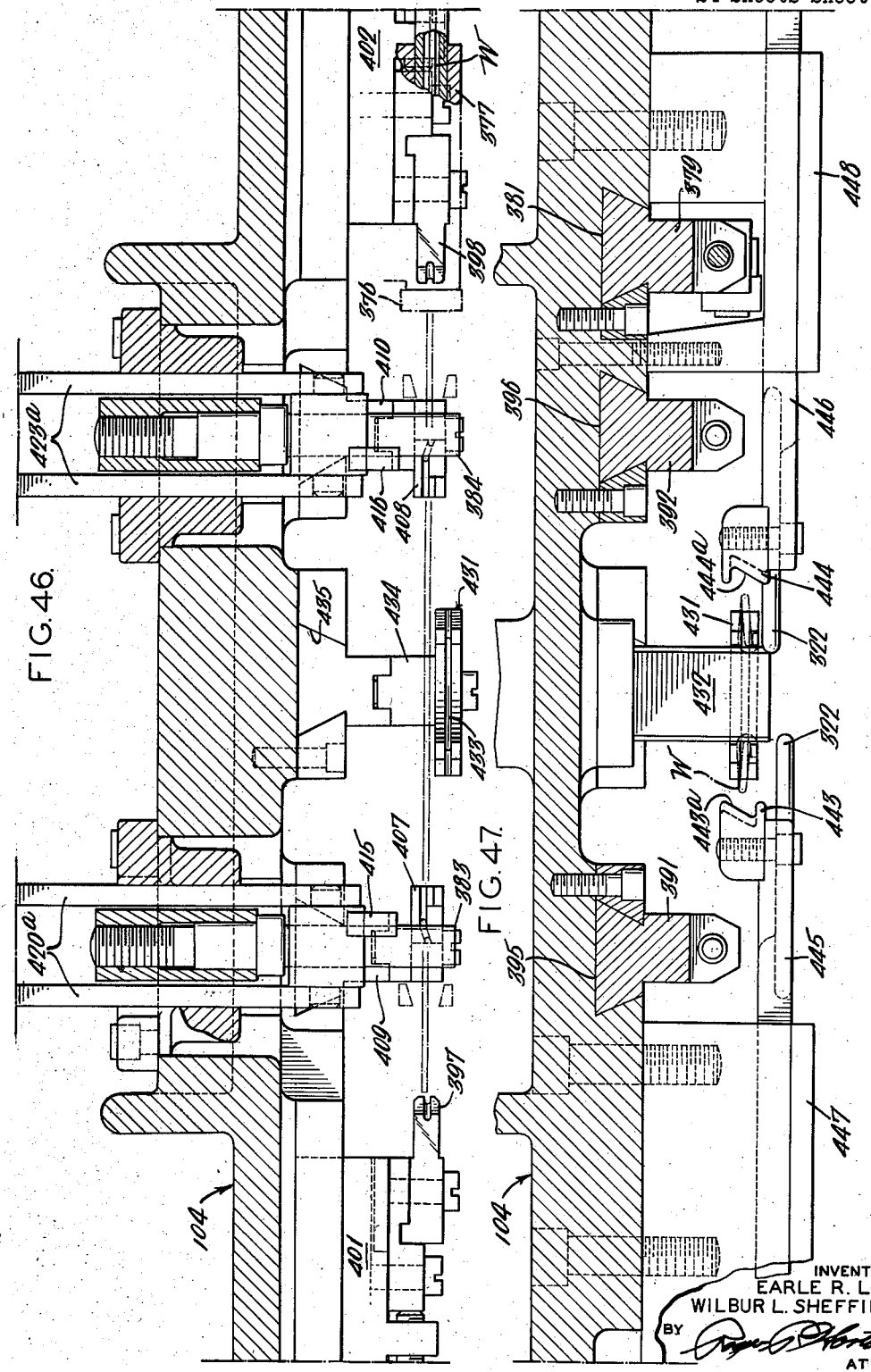

Aug. 11, 1959  E. R. LUTZ ET AL  2,898,817
AUTOMATIC MACHINE FOR MAKING AND CLOSING DYNAMITE
SHELL CARTRIDGES AND CASINGS
Filed June 15, 1956  AND SIMILAR APPARATUS  24 Sheets-Sheet 20
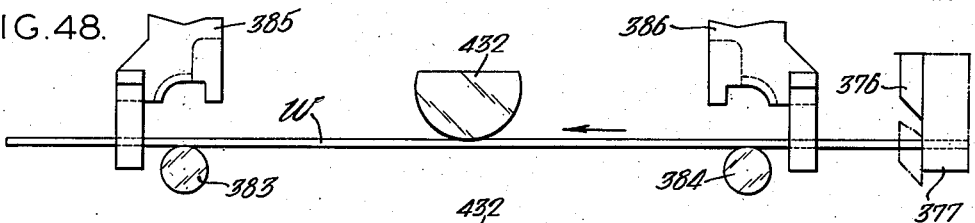
FIG.48.
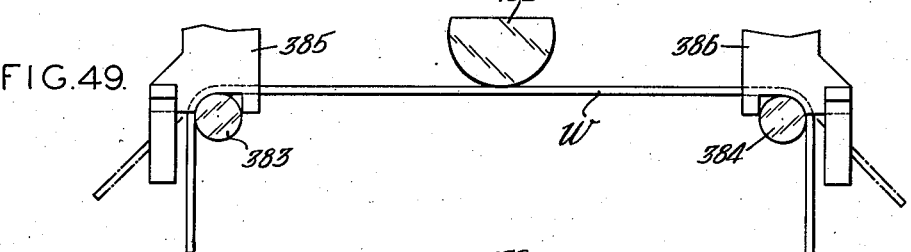
FIG.49.
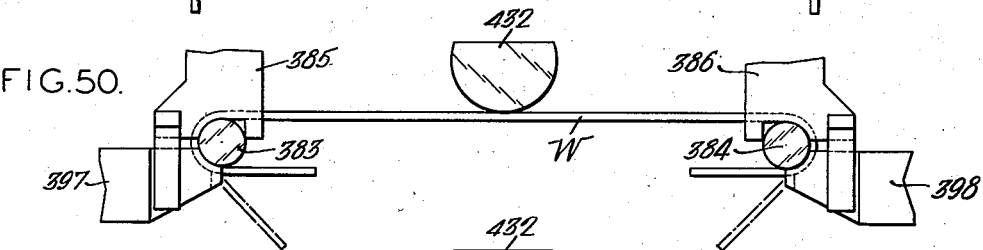
FIG.50.
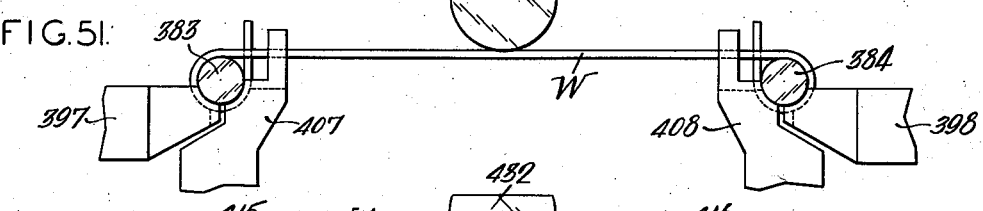
FIG.51.
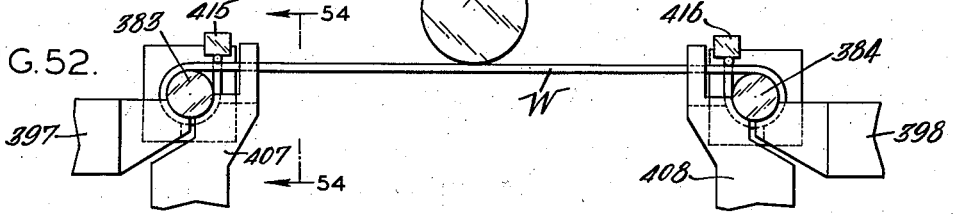
FIG.52.
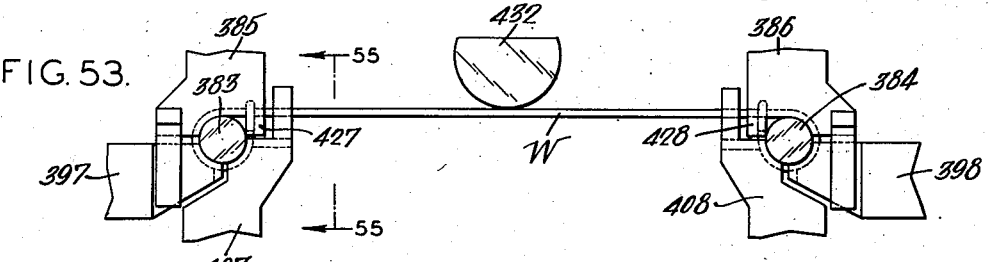
FIG.53.
INVENTORS:
EARLE R. LUTZ
WILBUR L. SHEFFIELD
BY 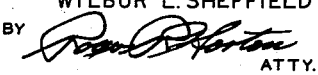
ATTY.

Aug. 11, 1959

E. R. LUTZ ET AL 2,898,817

AUTOMATIC MACHINE FOR MAKING AND CLOSING DYNAMITE
SHELL CARTRIDGES AND CASINGS
AND SIMILAR APPARATUS

Filed June 15, 1956

INVENTORS:
EARLE R. LUTZ
WILBUR L. SHEFFIELD
BY
ATTY.

Aug. 11, 1959 E. R. LUTZ ET AL 2,898,817
AUTOMATIC MACHINE FOR MAKING AND CLOSING DYNAMITE
SHELL CARTRIDGES AND CASINGS
Filed June 15, 1956 AND SIMILAR APPARATUS
24 Sheets-Sheet 24
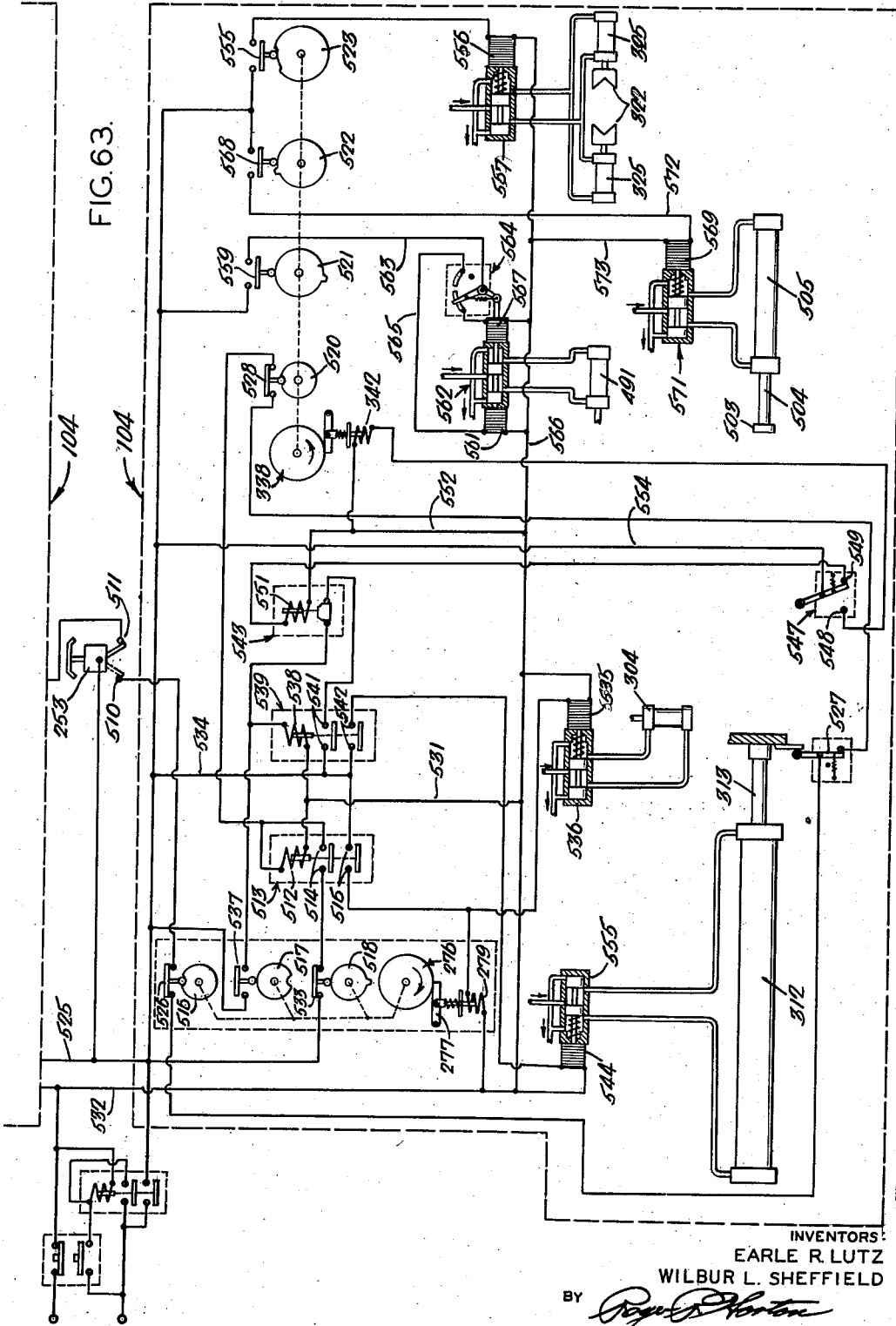
FIG.63.
INVENTORS:
EARLE R. LUTZ
WILBUR L. SHEFFIELD
BY 
ATTY.

United States Patent Office 2,898,817
Patented Aug. 11, 1959

2,898,817

AUTOMATIC MACHINE FOR MAKING AND CLOSING DYNAMITE SHELL CARTRIDGES AND CASINGS AND SIMILAR APPARATUS

Earle R. Lutz, Glenside, Pa., and Wilbur L. Sheffield, Westwood, Mass., assignors to Atlas Powder Company, Wilmington, Del., a corporation of Delaware Application June 15, 1956, Serial No. 591,575

26 Claims. (Cl. 93—39.1)

The present invention relates to new and useful improvements in automatic machines for making and closing dynamite shell cartridges and casings and similar apparatus and more particularly to new and useful improvements in machines of this type which will form dynamite shell cartridges and casings and similar apparatus in one continuous operation without any manual handling of the shell cartridges and casings and with a minimum number of machine operators.

Dynamite and similar explosive material generally is stored and transported in cylindrical casings formed generally of wound paper which may be from approximately one and one-half to nine inches in diameter and anywhere in the range of ten to forty inches long. During the manufacture of shell casings of this type one end of the casing is first formed to the desired shape and the dynamite is inserted into the casing from the other end which is then closed and sealed. At the present time there are three general types of dynamite shell cartridges and casings. The first type has a closed conical end secured with a wire bale-tie having loops for transporting the shell casings formed in the terminal ends thereof. The second type has an open conical end which has a small central opening therein for the insertion of a blasting initiator, the end being tied with a wire bale-tie similar to that mentioned above, while the third type has a flat end wherein the end of the tubing is crimped inwardly to lie in a plane extending transversely to the longitudinal axis of the casing and has a central opening therein for the insertion of a blasting initiator.

Prior to the present invention, dynamite shell cartridges and casings of this type were formed in a step by step operation on separate machines, or manually, and the first step in the operation was the formation of a continuous tube of spiral wound paper glued together to form a stiff cylindrical tube of the desired diameter. This tube was then cut on a separate machine into the desired lengths. The lengths of cylindrical tubing were then transported to a machine which produced the desired type of end on the tubing. After the end-forming operation of the tubes is completed, the conical end type casings have the bale-tie wire twisted around the formed end to maintain the end in position and afford a means for carrying and supporting the casing. This method of manufacture of shell casings required a considerable amount of manual handling of the casings and many of these operations were at least partially manual, thus increasing the cost of the finished product.

A manufacturer of dynamite and similar explosives in large quantities has the need for a considerable number of shell cartridges and casings, and the expense of manufacturing these shell cartridges and casings by completing each individual step in the manufacturing process on a separate machine, or manually, greatly increases the cost of the finished product. In addition, this type of manufacture of shell cartridges and casings and similar apparatus by using separate machines and manually handling the finished and partially finished shell cartridges and casings requires the use of a large building because of the considerable amount of floor space required for each of these machines.

With the foregoing in mind, the principal object of the present invention is to provide an automatic machine for making and closing dynamite shell cartridges and casings and similar apparatus automatically at a rapid rate in one continuous operation without any manual handling of the casings.

Another object of the present invention is to provide an automatic machine for making and closing dynamite shell cartridges and casings and similar apparatus automatically which can be readily adjusted to manufacture shell casings of various diameters and lengths.

Another object of the present invention is to provide an automatic machine for making and closing dynamite shell cartridges and casings and similar devices automatically which have provision therein for forming the conical closed end shell casings, the conical open end shell casings, or the partially closed flat end shell casings, and may be converted to form any one of these types of shell casings easily and quickly.

A further object of the present invention is to provide an automatic machine for making and closing dynamite shell cartridges and casings and similar apparatus automatically which will form a continuous cylindrical tube, cut the tube into any desired length, and then form closed ends on the cut cylindrical tubes automatically to completely manufacture a shell cartridge or casing in one continuous operation without any intermediate manual handling of the casing.

A still further object of the present invention is to provide a novel machine of the type described which will manufacture shell casings of the above described types relatively cheaply and which is entirely efficient and effective in operation and use.

These and other objects of the present invention and the various features and details of the operation and construction thereof are hereinafter more fully set forth and described with reference to the accompanying drawings, in which:

Fig. 1 is a schematic side elevational view of the apparatus of the present invention for making and closing dynamite shell cartridges and casings;

Fig. 2 is a schematic plan view of the apparatus illustrated in Fig. 1;

Fig. 3 is a side elevational view of the conical closed end casing formed by the apparatus of the present invention;

Fig. 4 is a fragmentary side elevation view partially in section of the conical open end casing produced by the apparatus of the present invention;

Fig. 5 is a side elevational view partially in section of the flat end shell casing formed by the apparatus of the present invention;

Fig. 6 is an end elevational view of the casing illustrated in Fig. 5;

Fig. 7 is a perspective view of the machine of the present invention for automatically forming shell cartridges and casings;

Fig. 8 is a fragmentary side elevational view of the machine of the present invention illustrating the cutting, transfer and shell forming apparatus;

Fig. 9 is an enlarged fragmentary transverse sectional view taken on line 9—9, Fig. 8;

Fig. 10 is a transverse sectional view taken on line 10—10, Fig. 8 illustrating the relative positions and operation of the cutting and transfer mechanism;

Fig. 11 is a rear end view of the transfer mechanism and apparatus for forming the closed or partially closed ends on the shell casings;

Fig. 12 is an enlarged front elevational view of one portion of the machine for closing the end of the shell casings;

Fig. 13 (Sheet 15) is an enlarged fragmentary transverse sectional view taken on line 13—13, Fig. 12 illustrating the mechanism for forming the conical end on the shell casing;

Fig. 15 is a fragmentary transverse sectional view taken on line 15—15, Fig. 12 illustrating a portion of the drive mechanism for the wire tying mechanism.

Fig. 16 is a fragmentary transverse sectional view taken on line 16—16, Fig. 12 illustrating a portion of the drive mechanism of Fig. 15;

Fig. 17 is an enlarged fragmentary longitudinal sectional view taken on line 17—17, Fig. 11 illustrating the mechanism for cutting the cylindrical tubing into the desired lengths and then transferring the same to the portion of the machine for forming the closed ends on the shell casings;

Fig. 18 is an enlarged fragmentary longitudinal view, partially in section, illustrating the mechanism for controlling the advance of the apparatus for cutting the cylindrical tube into the desired lengths;

Fig. 19 is an enlarged fragmentary longitudinal sectional view on one end of the pneumatic cylinder illustrated in Fig. 18 showing the mechanism for controlling the movement of the piston of the cylinder;

Fig. 20 is a rear elevational view of the target plate illustrated in Fig. 18 which engages the front end of the cylindrical tubing while it is being cut;

Fig. 25 is an enlarged fragmentary sectional view of the control mechanism which supports the target and which controls the advance of the cutting blade along with the cylindrical tubing;

Fig. 26 is a transverse sectional view taken on line 26—26, Fig. 25 illustrating a portion of the control mechanism of Fig. 25;

Fig. 27 is a transverse sectional view taken on line 27—27, Fig. 25 illustrating another portion of the control mechaism of Fig. 25;

Fig. 28 is a transverse sectional view taken on line 28—28, Fig. 25 illustrating a further portion of the control mechanism of Fig. 25;

Fig. 29 is a top plan view of the mechanism for actuating the cylinder and ram for forcing the cut length of cylindrical tubing into the crimping and wire tying apparatus;

Fig. 30 is a side elevational view of the apparatus illustrated in Fig. 29;

Fig. 31 is a transverse sectional view taken on line 31—31, Fig. 30 illustrating the construction of the apparatus of Fig. 29;

Fig. 32 is a transverse sectional view taken on line 32—32, Fig. 30 illustrating the adjusting mechanism for compensating for tubes of different lengths;

Fig. 33 is a transverse sectional view taken on line 33—33, Fig. 30 illustrating the support mechanism for holding the forming heads;

Fig. 34 is a fragmentary longitudinal view partially in section illustrating the forming head over which the conical end shell casing is formed;

Fig. 35 is a longitudinal view partially in section illustrating the forming head over which the flat end shell casing is formed;

Fig. 36 is a side elevational view partially in section of the wire feed mechanism which feeds the wire intermittently to the apparatus for tying the wire around the conical ends of the shell casings;

Fig. 37 is a side elevational view taken on line 37—37, Fig. 36 illustrating the drive mechanism for the wire feed mechanism;

Fig. 38 is a transverse sectional view taken on line 38—38, Fig. 37 illustrating the clutch mechanism which permits the wire to be fed in one direction only;

Fig. 39 is a transverse sectional view taken on line 39—39, Fig. 36 illustrating a portion of the mechanism for straightening the wire prior to its being fed into the wire tying mechanism;

Fig. 43 is a transverse sectional view taken on line 43—43, Fig. 42 illustrating the construction and operation of the mechanism for forming the loops in the end of the wire;

Fig. 44 is a framentary sectional view taken on line 44—44, Fig. 43 illustrating a portion of the wire forming mechanism of the present invention;

Fig. 45 is an enlarged longitudinal sectional view through the wire winding mechanism of the present invention illustrating the device for engaging the two loops of wire and then twisting the wire about the formed conical end of the shell casing;

Fig. 46 is a transverse sectional view taken on line 46—46, Fig. 42 illustrating the mechanism for forming the loops in the ends of the wire and also a portion of the mechanism for bending the wire upwardly;

Fig. 47 is a transverse sectional view taken on line 47—47, Fig. 42 illustrating the mechanism for bending the wire upwardly around the end of the conical end shell casings;

Figure 54:
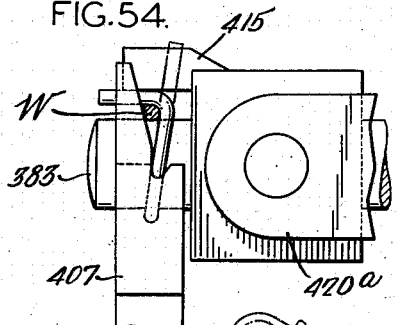
Figure 55:
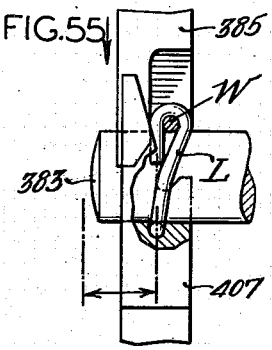
Figure 56:
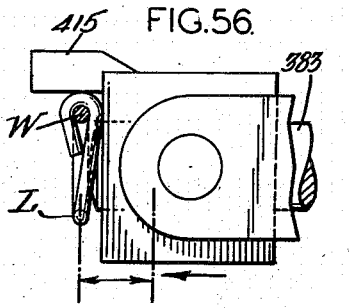
Figure 57:
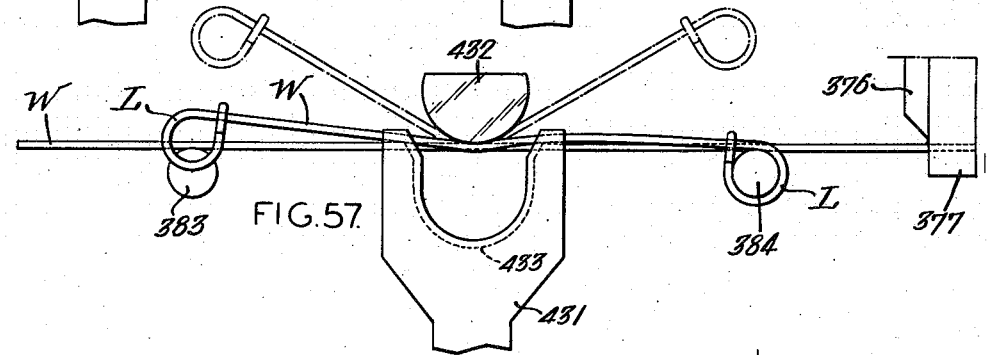
Figure 61:
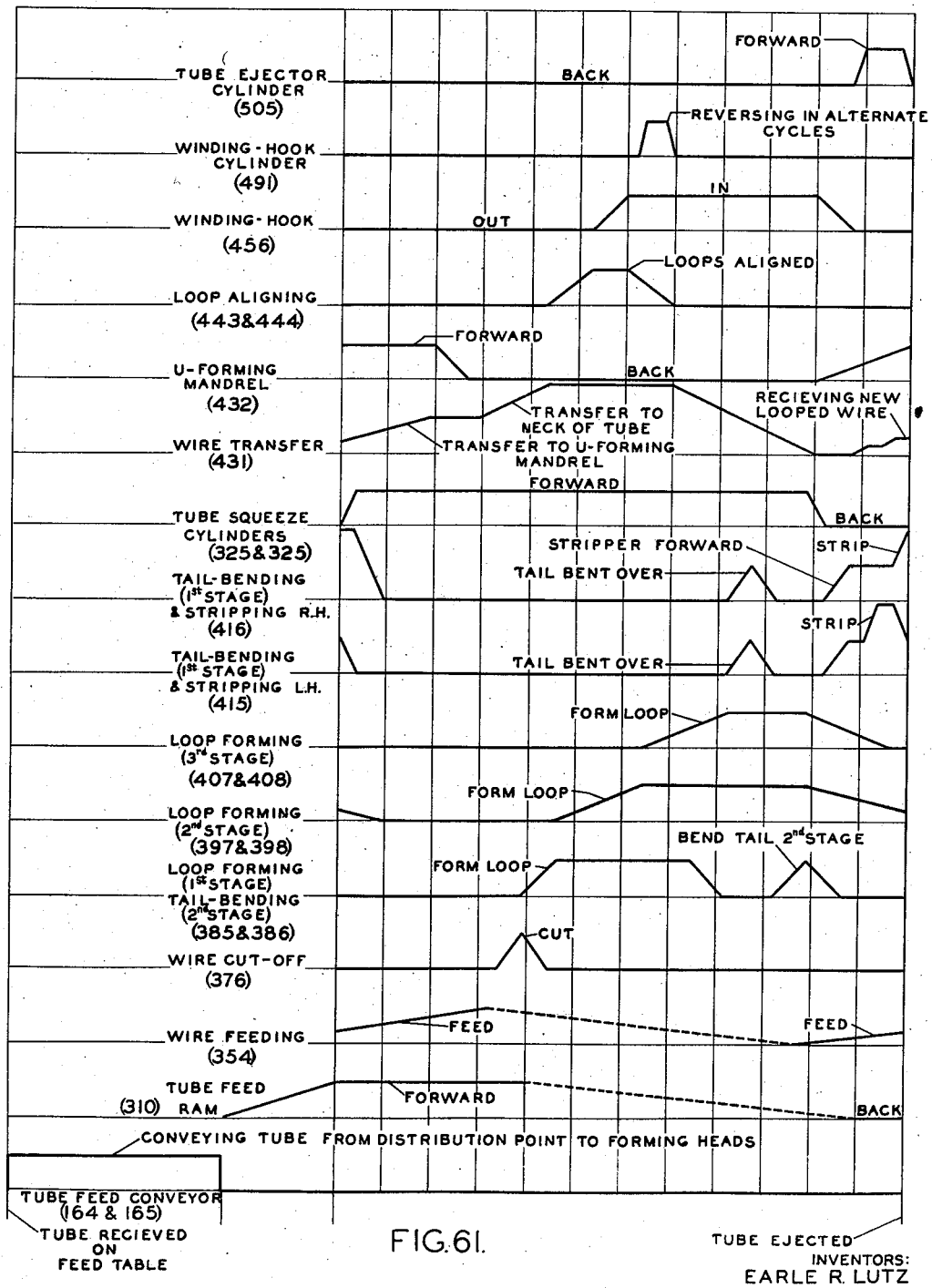
Figure 62:
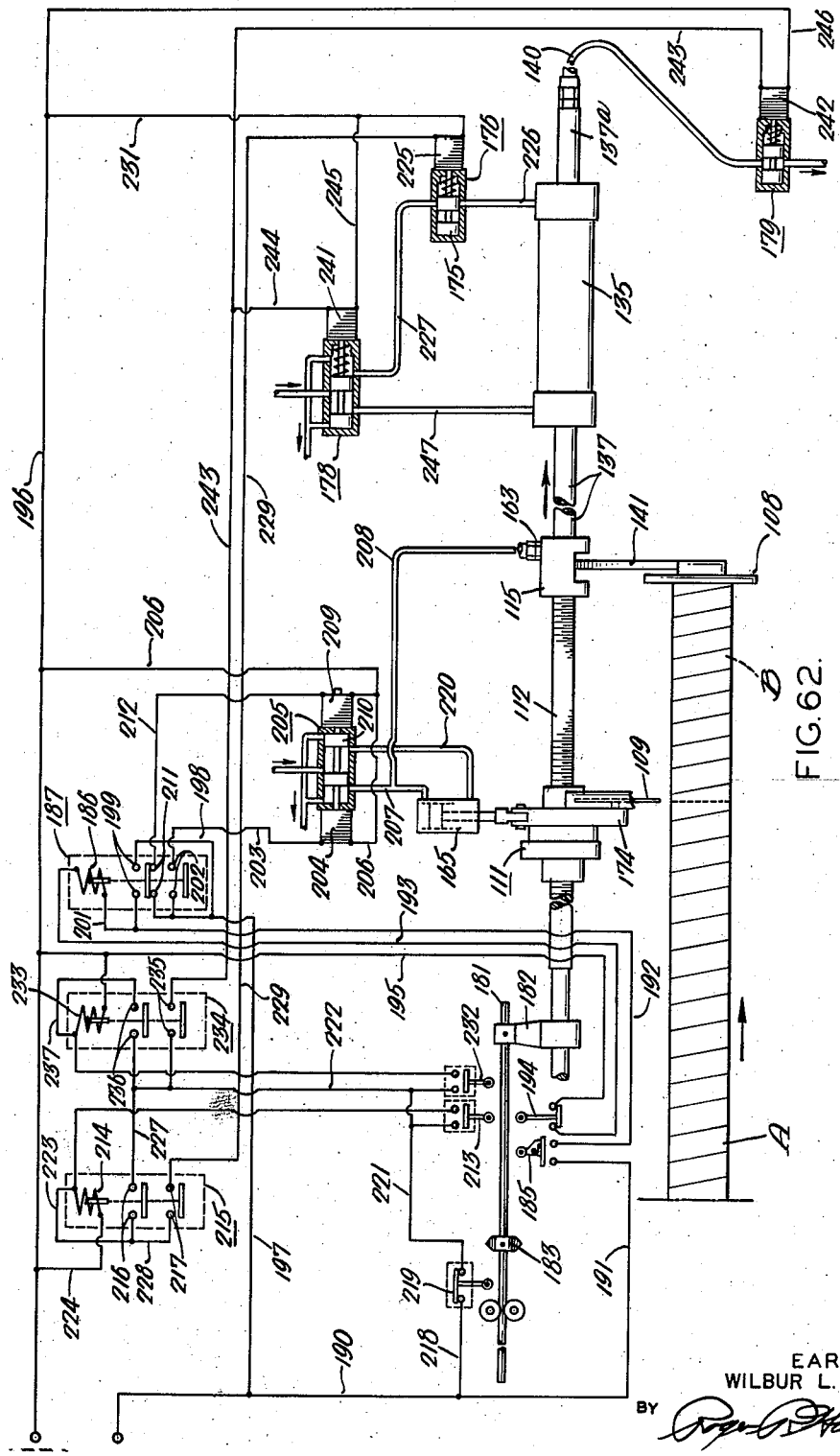

Figs. 48 to 53, inclusive, are schematic views illustrating the step by step operation in the forming of the wire loops at the opposite ends of the wire;

Fig. 54 is a side elevational view taken on line 54—54, Fig. 52 illustrating the mechanism in position for initially bending the locking portion of the wire over the end of the loop;

Fig. 55 is a side elevational view of the wire bending mechanism taken on line 55—55, Fig. 53 illustrating the mechanism for completing the locking of the end of the wire over the wire loop;

Fig. 56 is a side elevational view similar to Fig. 55 illustrating the mechanism for forcing the wire loop off of the loop mandrel;

Figs. 57, 58, 59 and 60 are schematic views illustrating the mechanism for bending the wire around the end of the conical shell casing and then twisting the wire to hold the shell casing in the closed position;

Fig. 61 is a timing and cam chart illustrating when each of the operations of the machine of the present invention takes place relative to the other operations;

Fig. 62 is a schematic wiring and pneumatic diagram of the control mechanism for advancing the saw blade along with the tube and cutting the tube into the desired lengths; and, Fig. 63 is a schematic wiring and pneumatic diagram illustrating the controls for the transfer mechanism, the tube closure mechanism, and the wire tying mechanism.

Referring more specifically to the drawings and particularly Figs. 1 to 7, inclusive, thereof, the machine for making and closing dynamite shell cartridges and casings and similar apparatus consists generally of a conventional tube forming machine 101 such as a Langston-Puck binder machine which forms a continuous length of cylindrical spiral wound glued tubing A; a cutting section 102 which cuts the cylindrical tubing A into predetermined lengths B; a transfer section 103 which receives the cut lengths of tubing B and transfers the same transversely of the machine; and a pair of doming, crimping and bale tieing sections 104, 104 which receive the cut lengths of tubing B and close one end of each piece of tubing. The machine of the present invention may be set to produce any one of three forms of shell casings. Fig. 3 illustrates the first form of shell casing C which has a closed conical end secured with a wire bale-tie 105. Fig. 4 illustrates the second form of shell casing D which has an open conical end secured with a wire bale-tie 106, while Fig. 5 illustrates the third shell casing formed by the machine of the present invention which has a flat crimped end having a central opening therein, as illustrated in Fig. 6. After the shell casings C, D, or E are formed according to the present invention, they are removed from the machine and taken to a further step in the explosive manufacturing process where the dynamite is inserted into the shell casings and the open bottom ends of the shell casings are closed and sealed.

In accordance with the present invention, the spiral wound tubing A is formed in a continuous length on a mandrel 107 which extends longitudinally of the machine. The tubing is formed and fed longitudinally along the length of the mandrel toward the front end of the machine at a rate of approximately 125 feet per minute. An important feature of the present invention is the provision of apparatus for cutting this continuous length of tubing A which is moving at a rate of 125 feet per minute into lengths of tubing B which are of predetermined length, in the range of 10 inches long to 40 inches long. In addition, the tube forming machine 101 and the mandrel 107 may be set to form tubing of predetermined diameter.

Referring now to Figs. 7 and 17, the cutting mechanism of the present invention comprises cutting means, drive means for the cutting means, and control means which causes the cutting means to move longitudinally with the continuous length of tubing A while the cutting means is cutting the tubing and, after the cut is completed, return the cutting means quickly to its starting position and start another cutting cycle. The control means for moving the cutting means is initially actuated when the forward end of the tubing A contacts a target plate 108 which then causes a saw blade 109 to be moved longitudinally with the continuous length of tubing A and contact the tubing A to cut the same.

Figure 21:
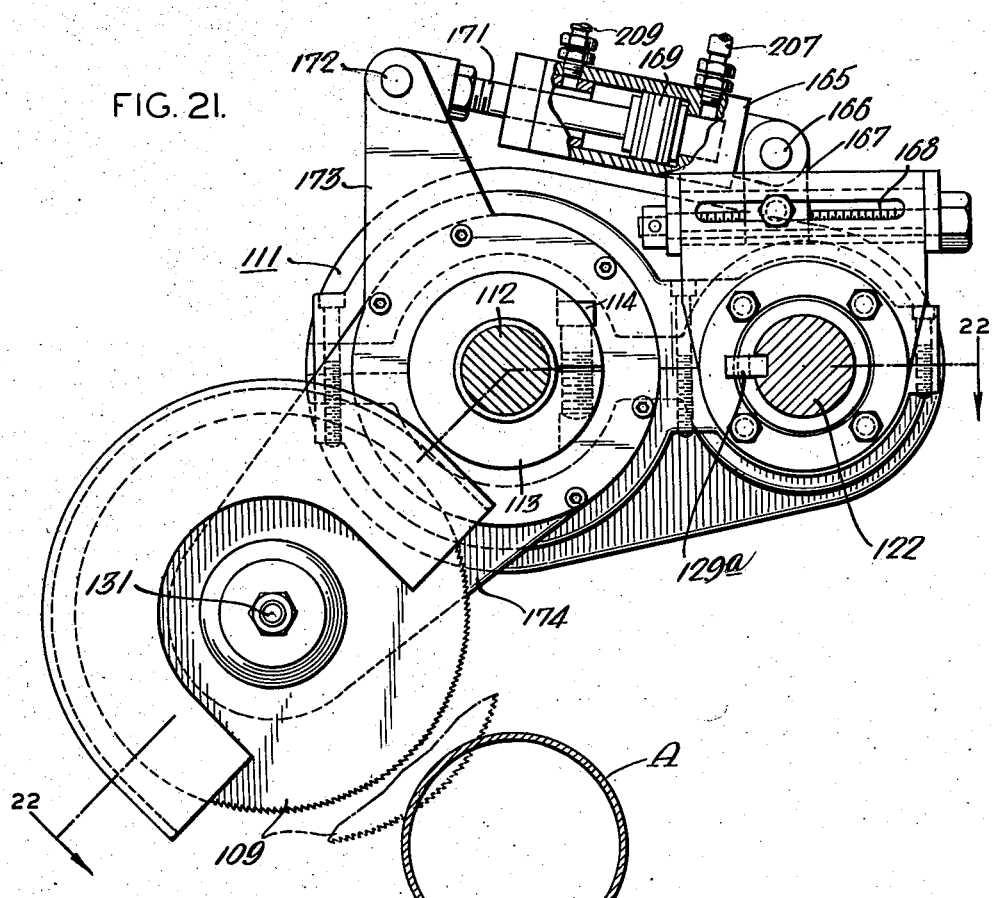
Fig. 21 is an enlarged fragmentary transverse sectional view taken on line 21—21, Fig. 17 illustrating the mechanism for cutting the cylindrical tubing into the desired lengths.
Figure 22:
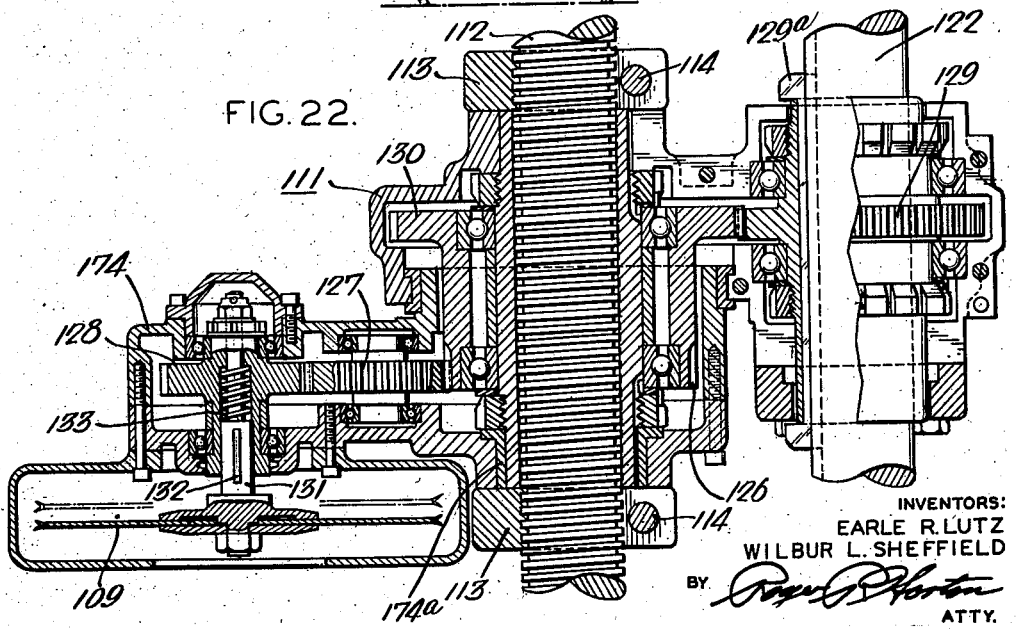
Fig. 22 is a sectional view taken on line 22—22, Fig. 21 showing the mechanism for operating the apparatus for cutting the tube.
Figure 23:
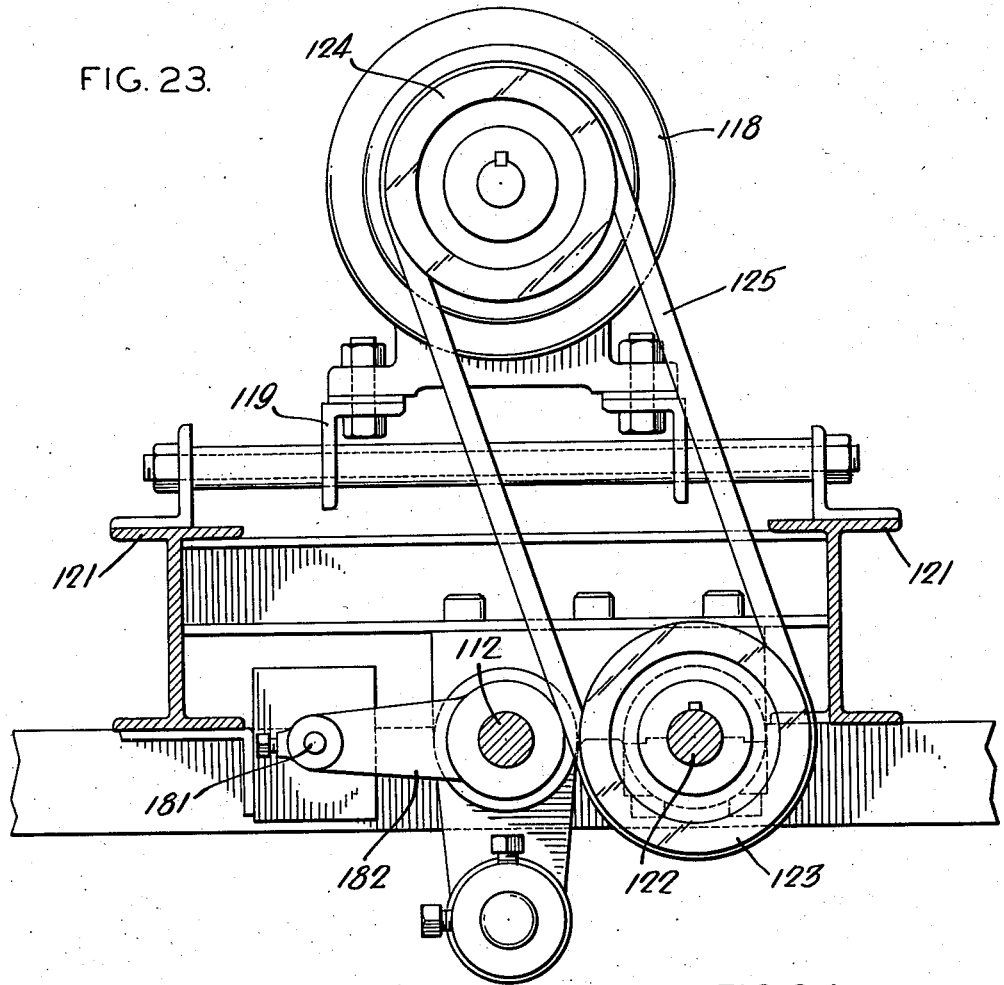
Fig. 23 (Sheet 10) is an enlarged front elevational view partially in section taken on line 23—23, Fig. 17 illustrating the drive mechanism for the cutting apparatus for the present invention.
Figure 24:
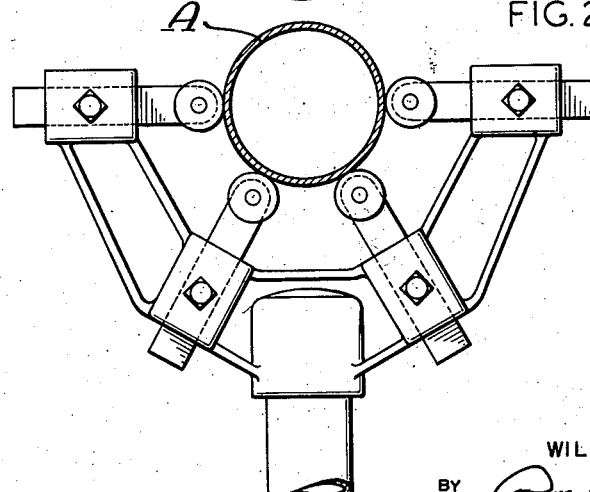
Fig. 24 is an elevational view illustrating the mechanism for supporting the cylindrical tubing while it is advancing from the tube forming machine and while it is being cut.

As set forth above, the machine of the present invention is designed to be readily adjustable to cut tubes of different lengths. To this end, the saw blade 109 is mounted in a housing 111, as illustrated in Figs. 21 and 22 (Sheet 9) which is adjustably carried by a jack shaft 112. A pair of split rings 113, 113 are threaded on the jack shaft at opposite ends of the housing 111 and are locked in position by means of locking bolts 114, 114. To adjust the position of the saw blade 109 relative to the target plate 108, the locking bolts 114, 114 in the threaded split rings 113, 113 are loosened and the split rings are moved longitudinally relative to the jack shaft, which in turn moves the saw housing and saw blade longitudinally relative to the jack shaft 112. When the saw blade is in the desired position relative to the target plate, the locking bolts 114, 114 are tightened thereby securing the housing 111 and saw blades 109 in position. The forward end of the jack shaft 112 is secured to the rear end of a target plate support bracket 115, for example as illustrated in Fig. 25, by means of a locking nut 116 threaded on a threaded end portion 117 of the jack shaft which extends through the target plate support bracket 115 and secures the end of the jack shaft 112 to the target plate support bracket 115.

The saw blade 109 is rotated continuously by means of drive mechanism actuated by an electric motor 118 mounted on a bracket 119 extending transversely of the frame 121 of the machine of the present invention. The motor 118 continuously rotates a splined shaft 122, which is mounted longitudinally of the machine in spaced parallel relation relative to the jack shaft 112, by means of a pair of pulleys 123 and 124 and a belt 125 connecting the two pulleys. The splined shaft 122 extends longitudinally through the saw blade housing 111 and engages a pinion 129 mounted within the housing 111. The pinion 129 is rotatably connected to the shaft 122 by means of a spline 129a, and may be moved longitudinally relative to the shaft 122 when the saw blade housing 111 is moved longitudinally of the machine. The pinion 129 in turn engages a gear 130 mounted within the housing 111 concentrically of the jack shaft 112. A second gear 126 formed integrally with the gear 130 drives an idler gear 127 which engages and causes rotation of a drive gear 128 secured to a shaft 131 mounting the saw blade 109, as shown on Fig. 22.

The saw blade 109 and shaft 131 are mounted for limited sliding movement longitudinally relative to the jack shaft 112 to compensate for any pressure which may be exerted longitudinally on the saw blade 109 by the continuous length of tubing A. This is accomplished by providing splined connection 132 between the shaft 131 and the hub of the gear 128. A coil spring 133 normally maintains the saw blade 109 in its forward limit position relative to the jack shaft 112 but the saw blade may be moved rearwardly against the pressure of the coil spring to the position shown in broken lines in Fig. 22 by pressure exerted on the saw blade by the tubing A.

In accordance with the present invention, when the forward end of the continuous length of tubing A contacts the target plate 108, the saw blade 109 is caused to move longitudinally with the continuous length of tubing A at the same rate of speed of the tubing A. The saw blade 109 is then moved laterally into engagement with the tubing A to cut a predetermined length from the tubing A. Longitudinal movement of the saw blade 109 is effective by means of a pressure cylinder 135, as illustrated in Fig. 19, which contains a piston 136 having a piston rod 137 extending rearwardly therefrom. The rear end of the piston rod 137 is fixedly secured to the forward end of the target plate mounting bracket 115 by means of a locking nut 138 which engages a threaded end 139 on the piston rod 137 and secures the same to the target plate mounting bracket 115, as illustrated in Fig. 25. When fluid under pressure is admitted to the left hand end of the cylinder 137, relative to Fig. 19, the piston 136, the piston rod 137, target plate mounting bracket 115, target plate 108, jack shaft 112, saw blade housing 111, and the saw blade 109 are moved to the right. In a similar manner, when pressure is admitted to the right hand end of the cylinder 135, these same parts are all moved to the left relative to Fig. 19.

An important feature of the present invention is the provision of means to cause the saw blade 109 to move at exactly the same speed as the rate of feed of the continuous length of tubing A. To this end, the target plate 108 is carried at the lower end of a target plate supporting rod 141 which is pivotally mounted as indicated at 142 on a yoke 143 rotatably carried by the target plate mounting bracket 115. As illustrated in Fig. 25, when the target plate is engaged by the forward end of the continuous length of tubing A, it is moved forwardly relative to the target plate supporting bracket 115 and an adjustable stop 144 carried by the target plate supporting rod 141 engages the rear end of a valve actuating stem 145 which extends longitudinally through the piston rod 137 and engages and actuates a spool valve 146 mounted within the piston 136. The spool valve 146, as illustrated in Fig. 19, is normally maintained in a closed position by means of a coil spring 147.

When fluid under pressure is being applied to the left hand face of the piston 136 and the spool valve is in its closed position, no fluid may be exhausted from the right hand face of the piston 136 and thus the piston 136 will not move relative to the cylinder 135. After the forward end of the continuous tubing A contacts the target plate 108 and moves the target plate to the right relative to the target plate mounting bracket 115, the valve actuating stem 145 moves the spool valve to the right, causing ports 148 in the spool valve 146 to be in communication with ports 149 in the right hand end of the piston 136. This permits the fluid in the right hand end of the cylinder 135 to be exhaused through the port in the spool valve 146 and thence longitudinally through a bore 151 in the right hand end extension 137a of the piston rod 137. A flexible conduit 140 attached thereto returns the fluid to the sump. The greater the movement of the spool valve 146 relative to the piston 136, the greater is the amount of area of the ports 148 which will coincide with the ports 149 in the right hand end of the piston 136 and thus the fluid may be exhausted from the right hand end of the cylinder 135 at a greater speed. After a short searching period at the beginning of the movement of the piston 136 and target plate 108, the spool valve 146 will be in a position wherein the piston 136 will be moved to the right at a speed equal to the rate of speed of the continuous length of tubing A. At this time the spool valve will be locked into position, as more full described hereinafter, and remain in its locked position until the end of the cutting operation.

A universal coupling 152 is provided between the target plate 108 and the target plate supporting rod 141, and coil springs 153 together with the universal coupling 152 permit the target plate to engage evenly against the end of the continuous length of tubing A, even though the tubing is not cut in a plane extending at right angles to the longitudinal axis thereof. In addition, while the tubing A is fed longitudinally of the machine it is also rotated by means of the tube forming machine 101 and accordingly, bearings 154 are provided between the target plate and the target plate support bracket to permit the target plate to rotate with the tubing A.

In some instances at the start of the operation of the machine defective tubing may be formed by the tube forming machine and it is necessary to move the target plate out of the path of travel of the continuous length of tubing A until the tube forming machine starts operating properly. Accordingly, the target plate yoke 143 is rotatable within the target plate supporting bracket 115, thereby permitting the target to be moved out of the path of travel of the tubing A. A pair of detents 155, 155 engaged by spring loaded detent balls 156, 156 normally maintains the target plate in the desired position relative to the axis of the continuous length of tubing A, but the target plate may be manually moved out of this position.

As previously stated, after a short searching period during the initial forward movement of the saw blade and the target the spool valve 146 is locked in position and the piston 136, target 108, and saw blade 109 move forwardly at a uniform rate of speed which is equal to the rate of feed of the continuous length of tubing A. The spool valve 146 is locked in this position by means of a locking pin 161 which has its upper end connected to a bellows 162 and its lower end positioned in engagement with the valve actuating stem 145, as illustrated in Fig. 25 and 28. As more fully described hereinafter, after the saw blade 109 is moved forward a predetermined distance, fluid under pressure is admitted through an inlet 163 in the top of the target supporting bracket 115 into engagement with the upper end of the locking pin 161, forcing the same downwardly into pressure applying relationship with the valve actuating stem 145, thereby preventing any further movement of the spool valve 146.

Simultaneously with the locking of the spool valve 146 in position, the saw blade 109 is caused to pivot downwardly about the jack shaft 112 into engagement with the continuous length of tubing A and cut the same. Movement of the saw blade 109 transversely with respect to the longitudinal axis of the continuous length of tubing A is effected by means of a pressure cylinder 165 which has its one end pivotally connected, as indicated at 166, to a bracket 167 adjustably mounted by means of an adjusting bolt 168 to the right hand end of the saw blade housing 111, as illustrated in Fig. 21. A piston 169 is slidably mounted interiorly of the cylinder 165 and has its piston rod 171 connected as indicated at 172 to an upwardly extending arm 173 formed integrally with a movable housing portion 174 carrying the saw blade assembly. The movable housing portion 174 which carries the saw blade and saw blade assembly, is mounted for movement about the axis of the jack shaft 112, the housing portion 174 being supported on a sleeve bearing 174a and rotatable about the bearing 174a. By this construction, when fluid under pressure is admitted to the right hand end of the cylinder 165, with respect to Fig. 21, the piston will move to the left causing the saw blade 109 to move to the position shown in broken lines in Fig. 21 into engagement with the tubing A and cut the tubing. In a similar manner, when fluid under pressure is admitted to the left hand end of the cylinder 165, the piston will be moved to the right hand end of the cylinder and the saw will be removed from engagement with the tubing A. By changing the position of the adjusting bolt 168, the relative position of the saw blade with respect to the longitudinal axis of the tubing A may be varied thus permitting the machine to accommodate tubes of different diameters.

After the tubing is cut by the saw blade, fluid under pressure is admitted to the left hand end of the cylinder 165, with respect to Fig. 21, thus moving the piston 169 to the right and retracting the saw blade leaving a cut piece of tubing B momentarily suspended between the cut end of the tubing A and the target 108. Simultaneously with retraction of the saw blade, the spool 175 of a solenoid operated valve 176, as shown in Fig. 62 (Sheet 23), is moved to the right permitting fluid to be exhausted from the right hand end of the cylinder 135 through a combination inlet and outlet opening 177. This permits the fluid under pressure at the left hand end of the piston 136 to move the piston rapidly to the right, thereby disengaging the target 108 from the end of the cut length of tubing permitting the cut length of tubing to fall freely. As the piston 136 of the cylinder 135 reaches the end of its stroke to the right, a four-way valve 178 and a two-way valve 179 are actuated causing fluid under pressure to be admitted to the right hand end of the cylinder 135 through the combination inlet and outlet opening 177 and stopping fluid from being discharged through the outlet opening 151 which communicates with the interior of the spool valve 146. This moves the piston 136 of the cylinder 135 together with the target plate 108 and saw blade 109 to the left thus putting the target plate and saw blade in position for another cutting cycle.

Fig. 62 is a schematic electrical and pneumatic diagram which illustrates the construction and operation of the control mechanism for controlling the operation of the saw blade and the movement of the saw blade and target plate. A control rod 181 is mounted on a bracket 182 extending outwardly from the rear end of the jack shaft 112 and carries a switch actuator 183. The switch actuator engages and actuates a plurality of microswitches in predetermined sequence which control the relative positions of the various cylinders and valves. Referring now to Fig. 62, the control system is shown in the position it assumes shortly after the end of the continuous length of tubing A has contacted the target plate 108 and during the searching period of the spool valve before the spool valve is locked in position. The piston 136 of the cylinder 135 together with the various pieces of equipment which are movable with the piston rod 137 are all being moved to the right. During such movement, the switch actuating member 183 first engages and momentarily closes a normally opened microswitch 185 which completes a circuit to the solenoid 186 of a relay 187, thereby energizing the relay 187. The circuit to the relay 187 is completed from one side of the line 190 through a lead 191, the switch 185, a lead 192, the solenoid 186, a lead 193, a normally closed microswitch 194 and lead 195 back to the other side of the line 196. After the switch 185 is opened the holding circuit for the solenoid 186 is completed from one side of the line 190, a lead 197 and 198, a set of relay contacts 199, 199, a lead 201, through the solenoid 186, the lead 193, the normally closed microswitch 194 and the lead 195 back to the other side of the line 196. It is to be noted that the switch 185 is only actuated to the closed position when the member 183 is being moved to the right and the switch 185 is designed to stay open when engaged from the left by the member 183.

Energization of the relay 187 also completes a circuit from one side of the line 190, the lead 197, a pair of relay contacts 202, 202 and lead 203 to a solenoid 204 at the left hand end of a four-way valve 205 and then through a lead 206 back to the other side of the line 196. When the circuit through the solenoid 204 of the four-way valve 205 is completed, the valve element 210 is moved to the left admitting fluid under pressure through the valve 205 and through a pressure line 207 to the rear end of the saw blade actuating cylinder 165. This moves the saw blade downwardly into contact with the continuous length of tubing A. At the same time, pressure is admitted through a pressure line 208 connected to the pressure line 207 which admits fluid under pressure through the inlet 163 in the top of the target plate mounting bracket 115 into engagement with the upper surface of the pin 161, thereby locking the valve stem 145 and the spool valve 146 in position.

Further movement to the right of the piston 136 will bring the switch actuating member into contact with the normally closed microswitch 194 and momentarily opens the microswitch 194. This breaks the previously described holding circuit for the relay 187 permitting the relay 187 to return to the position shown in Fig. 62. This, in turn, breaks the circuit to the solenoid 204 of the four-way valve 205 and completes a circuit to a solenoid 209 at the right hand end of the four-way valve 205 causing the valve element 206 to move to the right relative to Fig. 62. Fluid under pressure is then admitted to the forward end of the saw blade actuating cylinder 165 and the fluid is exhausted from the rear end of the cylinder 165 retracting the saw blade from engagement with the tubing. The fluid is admitted under pressure to the forward end of the saw blade actuating cylinder 165 through the four-way valve 205 and a pressure line 220. At the same time, the pressure is also released from the upper end of the locking pin 161, permitting the spool valve 146 to again be moved. The circuit is completed through the solenoid 209 of the four-way valve 205 from one side of the line 190, the lead 197, a pair of relay contacts 211, 211 in the relay 187, a lead 212 through the solenoid 209 and then through the lead 206 back to the other side of the line 196.

Simultaneously with the opening of the switch 194, a normally opened microswitch 213 is momentarily engaged and closed by the switch actuating member 183. Momentarily closing the microswitch 213 will energize the solenoid 214 of a relay 215 and complete a circuit through two pairs of relay contacts 216, 216, and 217, 217. The relay 215 is then maintained in its energized position by means of a holding circuit completed from one side of the line 190 through a lead 218, a normally closed microswitch 219, leads 221 and 222, the contacts 216, 216 of the relay 215, a lead 223, the solenoid 214, and a lead 224 to the other side of the line 196.

Energization of the relay 215 also completes a circuit to the solenoid 225 of the two-way valve 176 which moves the piston 175 of the valve 176 to the right with respect to Fig. 62. This permits the fluid to be exhausted rapidly from the right hand end of the cylinder 135 through the pressure lines 226 and 227, the valve 176 and the four-way valve 178. The pressure of the fluid at the left hand end of the cylinder 135 will then move the piston 136 of the cylinder 135 at a rapid rate of speed to the right, thereby withdrawing the target 108 from engagement with the end of the cut section of tubing, permitting the cut section of tubing to be dropped, as previously described. The circuit through the solenoid 225 of the cylinder 176 is completed from one side of the line 190, the lead 218, the microswitch 219, the lead 221, the lead 222, a lead 227, the relay contacts 216, 216, a lead 228, the relay contacts 217, 217, a lead 229 through the solenoid 225, and then through a lead 231 to the other side of the line 196.

At the end of the stroke of the piston 136 to the right, the switch actuating member 183 engages and momentarily closes a normally open microswitch 232 which in turn momentarily completes a circuit through the solenoid 233 of a relay 234. Energization of the relay 234 closes two pairs of relay contacts 235, 235 and 236, 236. The relay is maintained in the energized position of a holding circuit completed from one side of the line 190, through the lead 218, the microswitch 219, the lead 221, the lead 222, through the relay contacts 236, 236, a lead 237, the solenoid 233, and the lead 195 to the other side of the line 196. At the same time, energization of the relay 234 will complete a circuit to the solenoid 241 of the four-way valve 178 and the solenoid 242 of the two-way valve 179, moving the valve elements of the valve 178 and 179 to the right with respect to Fig. 62. The circuit through the solenoid 241 of the four-way valve 178 is completed from one side of the line 190, the lead 218, the microswitch 219, the lead 221, the lead 222, the relay contacts 235, 235, a lead 243, a lead 244, through the solenoid 241 of the four-way valve 178, a lead 245, and then through the lead 231 to the other side of the line 196. At the same time, the circuit to the solenoid 242 of the two-way valve 179 is completed from the lead 243 through the solenoid 242, and a lead 246 to the other side of the line 196. When the solenoids 241 and 242 of the four-way valve 178 and the two-way valve 179 are closed, the two-way valve 179 prevents fluid from being exhausted through the outlet 151 from the spool valve 146 while the four-way valve 178 admits fluid under pressure through the pressure lines 227 and 226 and the valve 176 to the right hand end of the cylinder 135. At the same time, the fluid is exhausted from the left hand end of the cylinder 135 through the pressure line 247 and the four-way valve 178. This causes the piston 136 of the cylinder 135 to be moved rapidly to the left, thus returning the target 108 and the saw blade 109 to their initial starting position.

When the piston 136 reaches its extreme left hand position relative to Fig. 62, the switch actuating member 183 engages and momentarily opens the microswitch 219 through which the holding circuits to the relays 215 and 234 are completed. This causes de-energization of the relay 215 and 234 and all of the valves are returned to the positions that are shown in Fig. 62. When the forward end of the continuous length of tubing A engages the target plate 108, the spool valve 146 is again opened, thereby starting another cutting cycle and the control means for the cutting mechanism again operates in the above described manner.

When the cut sections of tubing B are dropped by the target plate 108, they are received in the transfer section 103 of the machine, and alternate tubes B are then conveyed by the transfer section transversely of the machine to the right and left doming, crimping, and bale tieing machines 104, 104, respectively. With reference to Figs. 8, 9, 10 and 17, the cut pieces of tubing B drop vertically downward onto a transfer table 250 between guide plates 251 and 252 into engagement with a pressure sensitive distributing switch 253. The pressure sensitive distributing switch 253 controls the operating mechanism for the transfer section of the machine, so that the first tube that is dropped on the table will be moved by the transfer mechanism to the left hand end of the transfer table and the next tube will then be moved to the right hand end of the transfer table for further operations by the two doming, crimping, and bale tieing machines 104, 104.

According to the present invention, means are provided to adjust the height of the transfer table relative to the two doming, crimping and bale tieing machines, so that the longitudinal axis of the cut tubing will coincide with the axis of the doming, crimping and bale tieing machines, thereby permitting the machine to be adjusted to accommodate tubes of different diameters. To this end, support brackets 254, 254 formed as part of the transfer table 250 are slidably mounted on vertical guide posts 255, 255. The upper ends of the guide posts are threaded, as indicated at 256, 256 and receive threaded collars 257, 257 which are carried in supporting brackets 258, 258 secured to the transfer table. The threaded collars 257, 257 have teeth formed exteriorly thereon which are engaged by worm gears 259, 259 mounted on shafts 261, 261 extending transversely of the machine. The shafts 261, 261 are driven from a shaft 262 by means of pairs of bevel gears, and a hand wheel 263 carried by the shaft 262 may be manually turned, thereby causing rotation of the threaded collars 257, 257 and raising or lowering the transfer table 250. By this construction, the entire transfer table and associated mechanisms may be positioned relative to the doming, crimping and bale tieing machines to accommodate tubes of different diameters.

A pair of cleat conveyors 264 and 265 each having two sets of cleats 266, 266 and 267, 267, respectively, extending outwardly therefrom are mounted on the transfer table for movement transversely of the machine and the cleats of the conveyors are adapted to extend upwardly through longitudinal slots 268 in the upper surface of the transfer table, as shown in Fig. 17. The first conveyor 264 is operable to engage a cut piece of tubing B dropped by the target plate on the distributing switch and move the same to the left, relative to Fig. 10, to a position in axial alignment with the longitudinal axis of the left hand doming, crimping and bale tieing machine, while the right hand conveyor 265 is operable to engage a cut piece of tubing on the distributing switch and move the same to the right with respect to Fig. 10. Both of the conveyors 264 and 265 are driven from an electric motor 268 which, by means of a chain drive 269, causes continuous rotation of a shaft 271 extending transversely of the machine beneath the transfer table 250. The shaft 271 has a pair of bevel gears 272 and 273 fixedly secured to its opposite end portions which engage a second pair of bevel gears 274, and 275, respectively, at the left and right hand sides of the machine with respect to Fig. 10. The bevel gears 274 and 275 in turn, through drive mechanism more fully described hereinafter, drive the conveyors 264 and 265, respectively.

With reference to the drive mechanism for the conveyor 264, the bevel gear 274 carrys a single revolution clutch 276 which, for example, may be a conventional helix type single revolution clutch. Disengaging a stop finger 277 from the clutch will permit pawls in the clutch to engage one another causing the clutch to make a single revolution. At the end of one revolution, the pawls in the clutch then reengage the stop finger and disengage the clutch. The stop finger 277 is normally forced into engagement with the clutch by a coil spring 278 and is caused to be momentarily disengaged from the clutch by means of a solenoid 279 having its core connected to the stop finger as indicated at 281. The single revolution clutch imparts intermittent rotary motion to a stub shaft 282 extending longitudinally of the machine in engagement with a drive gear 283. The gear 283 engages a pinion 284 interconnected with a tubular drive shaft 285 which is mounted for free rotation on a shaft 280 carried in the supporting side frames of the table 250. The shaft 285 carries a plurality of sprocket wheels 286 thereon, mounted in engagement with the chains 287 of the cleat conveyor 264 and the sprocket wheels support and provide drive connections for the chains 287. The two sets of cleats 266, 266 are so positioned on the cleat conveyor 264 that one revolution of the shaft 282 will move the cleats 266 half way around the path of travel of the conveyor 264. During such movement of the cleats caused by one revolution of the shaft 282, the cleats 266 will engage the cut piece of tubing B resting on the distributing switch 253 and move the cut piece of tubing to a position in axial alignment with the longitudinal axis of the doming, crimping and bale tieing machine 104, as illustrated in Fig. 10. The other bevel gear 275 which is rotated by the shaft 271 drives the other cleat conveyor 265 in manner similar to that described above.

When changing the machine of the present invention to manufacture shell casings of different diameter, it is necessary to adjust the position of the cleat conveyors 264 and 265, so that the sets of cleats will be stopped at a distance from the longitudinal axis of the doming, crimping, and bale tieing machines equal to one half of the diameter of the shell casings being formed. To this end, an adjustable clutch connection 288 of conventional construction is provided between the pinion 284 and the tubular drive shaft 285. By disconnecting the clutch 288 from the pinion 284, the tubular drive shaft 285 may be manually rotated to thereby place the cleats 266 in the desired position relative to the longitudinal axis of the doming, crimping and bale tieing machine. The clutch is then engaged with the pinion 284 and locked in position.

The shaft 291 which carries the inner end of the cleat conveyor 264 is supported by an adjusting block 292 mounted for horizontal movement transversely of the machine in a guide 293 formed in the transfer table 250. The position of the adjusting block relative to the guide may be changed by means of a threaded adjusting bolt 294 having one end thereof secured to the adjusting block 292 and the other end thereof secured to a bracket 295 extending outwardly from the transfer table adjacent the guide slot 293. By moving the shaft 291 of the cleat conveyor 264 toward or away from the shaft 284 the tension on the conveyor chains 287 which carry the cleats 266 may be decreased or increased. In a similar manner, the cleat conveyor 265 has adjusting means, designated generally as 296, which are the same as the adjusting means above described for the cleat conveyor 264.

Stop means 297 cooperate with the cleats 266 of the cleat conveyor 264 to engage the opposite side of the cut piece of tubing from the cleats 266 and positively position a cut piece of tubing B in front of the doming, crimping and bale tieing machine. The stop means 297 consists of a pair of arms 298, 298 mounted for rotary movement about the axis of the conveyor shaft 285 on a shaft 280 between predetermined upper and lower limit positions. A cross-tie member 300 connects the upper end of the arms and carries a plurality of stop plates 299, each of which has a shaft 301 extending rearwardly therefrom for securing the same in recesses 302, 302 formed in the cross tie member 300. Wing bolts 303 maintain the shafts 301 in position and permit relative adjustment of the stop plates 299 with respect to the member 300 to thereby compensate for the different diameter shell casings which may be formed by the machine of the present invention. The arm 298 is caused to be moved between its upper and lower limit positions by means of a pneumatic cylinder 304 which contains a movable piston having its piston rod 305 pivotably secured to the outer end of a crank arm 306 also secured to the shaft 280. When air under pressure is admitted to the lower end of the pneumatic cylinder 304, the arm 298 is caused to move to its upper limit position and, in a similar manner, when air under pressure is admitted to the upper end of the pneumatic cylinder 304, the arm 298 is caused to move to its lower limit position, thereby removing the stop plates 299 from the path of travel of the cleats 266. Stop means 290 formed and actuated similar to the above described stop means 297 is associated with the cleat conveyor 265 to position the cut pieces of tubing B which are transported by the cleat conveyor 265.

In accordance with the present invention, after a cut section of tubing B is positioned by the cleat conveyor 264 in alignment with the axis of the doming, crimping and bale tieing machine 104, the tubing is inserted in the machine, and one end thereof is formed to the desired shape and has wire bale tie twisted thereabout to complete the manufacture of the shell casing. One of the two doming, crimping and bale tieing machines associated with the apparatus of the present invention will be described herein, it being understood that the other doming, crimping and bale tieing machine is constructed and operated in exactly the same manner as the one described. Similar reference characters indicate like parts on the similar machines.

After the cut piece of tubing B is positioned on the transfer table 250 by the cleat conveyor 264 in alignment with the longitudinal axis of the doming, crimping and bale tieing machine, it is inserted into the doming, crimping and bale tieing machine by a ram 310 which is mounted on a pair of slides 311, 311, as illustrated in Figs. 29 and 30, for longitudinal movement relative to the doming, crimping and bale tieing machine between forward and rearward limit positions. Forward and rearward movement of the ram 310 is effected by means of a pneumatic cylinder 312 mounted beneath the slides 311, 311 and having the forward end of its piston rod 313 secured to the rear end portion of the ram 310. When air under pressure is admitted to the rear end of the cylinder 312, the ram 310 is caused to move to its forward limit position, and when air under pressure is admitted to the forward end of the cylinder 312, the ram 310 is caused to move to its rearward limit position.

During forward movement of the ram 310, the ram is engaged within a cut section of tubing B positioned by the transfer mechanism against the stops 299 and forces the cut piece of tubing longitudinally forward into the doming, crimping and bale tieing machine. A split ring 314 surrounding the ram 310 and adjustably mounted in slots 315 in the ram engages against the rear surface of the cut piece of tubing B to force the same forward. Bolts positioned about the periphery of the split ring 314 maintain the ring in the desired position relative to the ram 310 and by adjusting the position of the ring 314 along the longitudinal axis of the ram, the apparatus of the present invention may thereby be adjusted to accommodate tubes of different lengths. Removably secured to the forward end of the ram 310, as illustrated in Fig. 34, is a forming head 316. The forming head 316 illustrated in Fig. 34 is used when it is desired to manufacture the conical end shell casings illustrated in Fig. 3 of the drawings. When it is desired to manufacture the flat open end casings, as illustrated in Figs. 5 and 6 of the drawings, a forming head 316a shaped, for example as illustrated in Fig. 35 of the drawings, is secured to the forward end of the ram 310. After the ram inserts a cut length of tubing B into the doming, crimping and bale tieing machine, the ram is retracted leaving the piece of tubing in the doming, crimping and bale tieing machine.

The apparatus of the present invention is illustrated arranged to form conical closed end shell casings C, as shown in Fig. 3 of the drawings. When the ram 310 forces the cut piece of tubing B inwardly into the doming, crimping and bale tieing machine 104, the forward end of the tubing, which is positioned over the forming head 314 of the ram, is engaged within a forming die 320 constructed as shown in Figs. 12 and 13 (Sheets 6 and 7 of the drawings). The forming die 320 is mounted within the doming, crimping and bale tieing machine in axial alignment with the longitudinal axis of the ram 310. The inner surface of the forming die is generally frustroconical in shape, is open at both ends, and has secured thereto a plurality of flutes 321 which converge inwardly toward the rearward end of the forming die and operate to crease the end of the tubing B and cause the same to be neatly folded inwardly by the forming die 320 about the forming head 316 of the ram.

Figure 41:
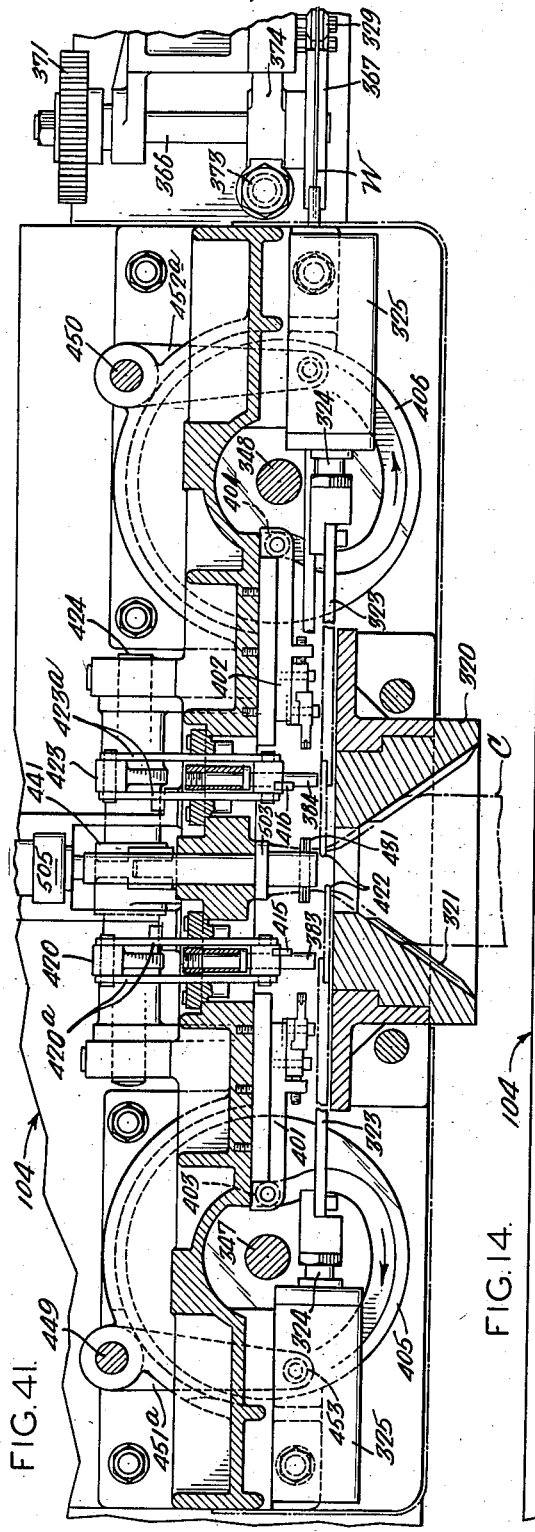
Fig. 41 is a fragmentary transverse sectional view taken on line 41—41, Fig. 40 illustrating the apparatus for actuating the wire tying mechanism of the present invention.
Figure 14:
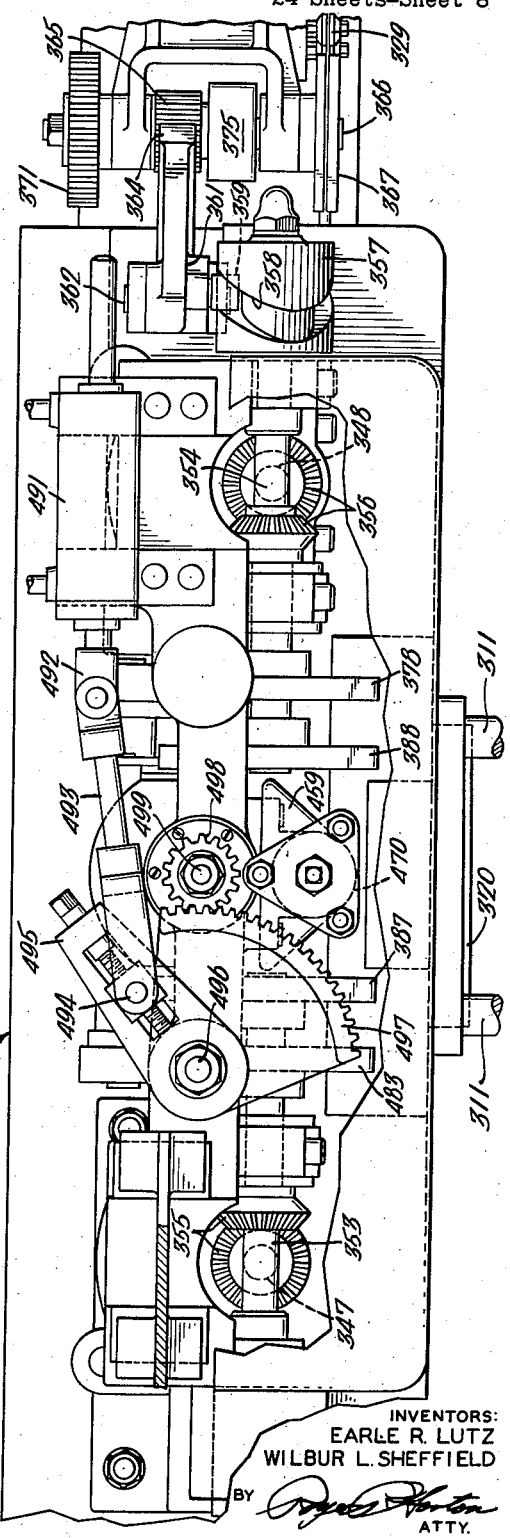
Fig. 14 (Sheet 16) is an enlarged fragmentary plan taken on line 14—14, Fig. 12 illustrating part of the mechanism for controlling the operation for tying the wire around the conical end of the shell casing.
Figure 40:
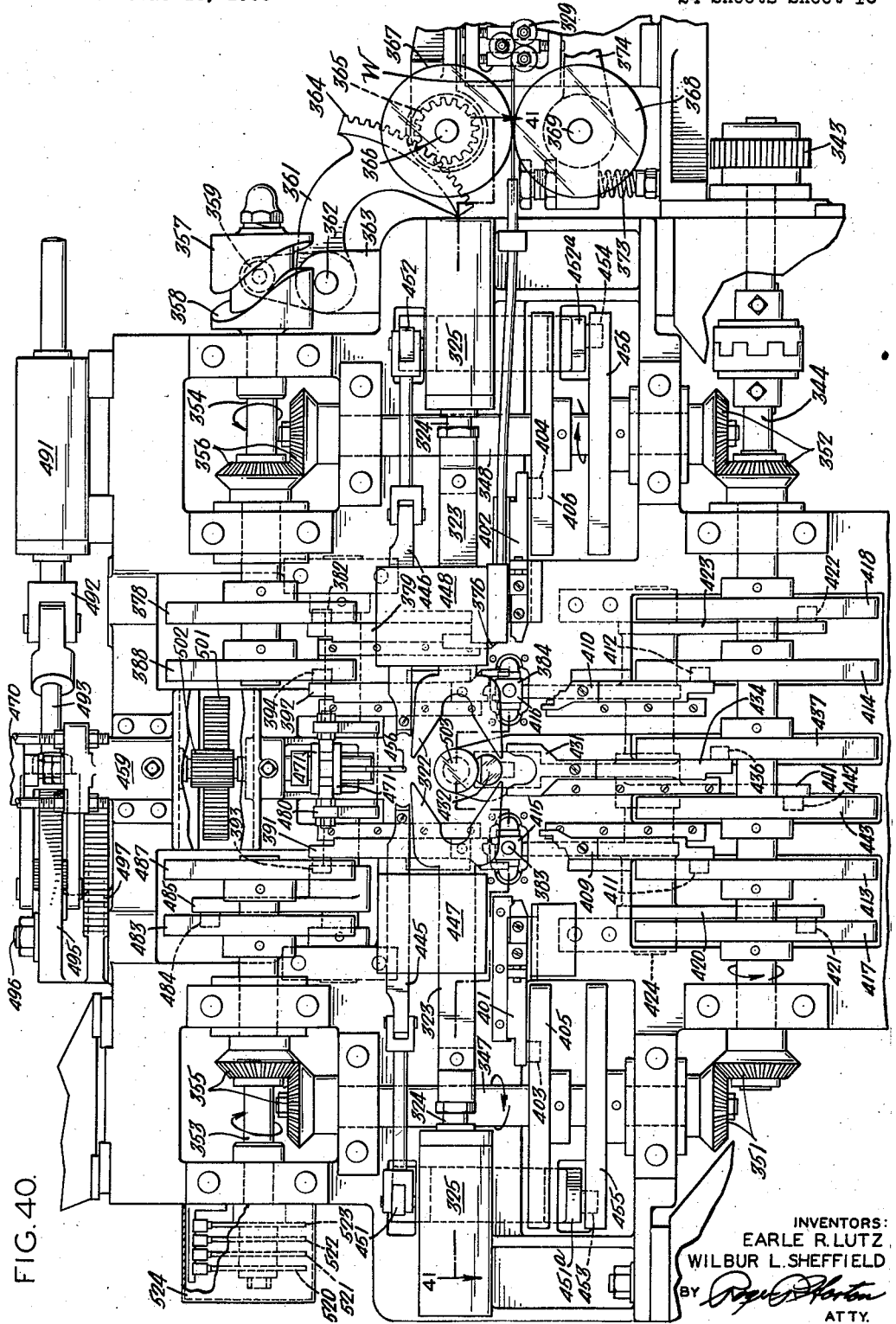
Fig. 40 is a front end elevational view of the wire tying mechanism and mechanism for forming the closed ends of the shell casing of the present invention and the control apparatus for the wire tying mechanism and mechanism for forming the closed ends of the shell casing.
Figure 42:
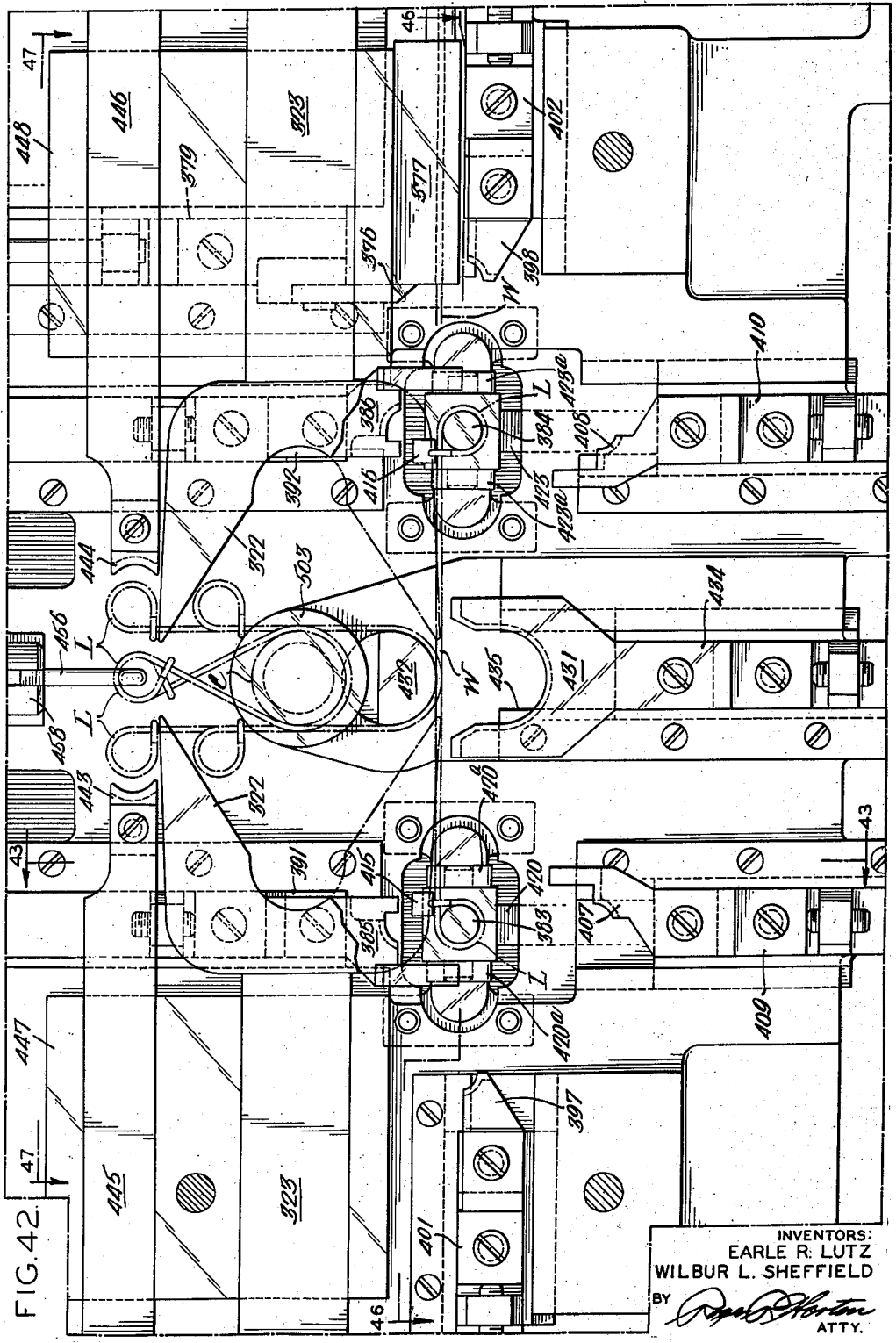
Fig. 42 is an enlarged elevational view of the mechanism for forming the wire and positioning the wire about the conical end of the shell casing prior to twisting the wire.

After the conical end portion of the shell casing C is formed, a pair of tube squeeze rams 322, 322, as shown in Figs. 40, 41 and 42 of the drawings, mounted rearwardly adjacent the forming die at opposite sides thereof are moved laterally inward perpendicular to the axis of the forming die into engagement with the neck of the tubing, as shown in broken lines in Fig. 13 to close the neck of the tubing and maintain the same in the closed position during subsequent operations of the doming, crimping and bale tieing machine. The tube squeeze rams 322, 322 are each carried by the forward ends of supporting arms 323, 323 which in turn are secured to the forward ends of piston rods 324, 324 for pneumatic cylinders 325, 325. After the forward end of the shell casing C is formed, air under pressure is admitted to the rear ends of the pneumatic cylinders 325, 325, causing the same to actuate the squeeze rams 322, 322 forwardly into engagement with the neck of the shell casing C to maintain the same in the closed position. Prior to removal of a completed shell casing C from the machine, air under pressure is admitted to the forward end of the pneumatic cylinders 325, 325, thereby retracting the tube squeeze rams from engagement with the neck of the shell casings.

Subsequent to the formation of the conical end portion on the shell casing, wire W is twisted about the neck of the shell casing as shown at 105 in Fig. 3. The wire W is fed into the machine from a source of supply (not shown) through a pair of wire straighteners 326 and 327 each consisting of a plurality of rollers 328 and 329, respectively, which flex the wire in planes at right angles to each other, as illustrated in Fig. 36, and remove all of the kinks from the wire. The wire then has loops L, L formed in its opposite end portions, is wrapped about the neck of the shell casing, and is twisted to cause the wire to maintain the neck of the shell casing in its closed position and also provide a means for carrying the finished shell casing.

According to the present invention, common drive means are provided for the wire feed and wire forming operations, and control mechanism more fully described hereinafter, coordinate the feeding, forming and twisting of the wire with the positioning and removal of a shell casing within the forming die 320. To this end, a motor 330 causes continuous rotation of a drive shaft 331 which extends transversely through both of the doming, crimping and bale tieing machines, and actuate separate drive mechanisms within both of the machines. The drive shaft 331 is driven by the motor 330 by means of a drive chain 332 which engages sprockets 333 and 334 mounted on the motor shaft and drive shaft, respectively. Secured to one end of the drive shaft 331 is a pinion 335 which engages and continuously rotates a gear 336 mounted for rotary movement on a stub shaft 337. The gear 336 is carried by one portion of a single revolution clutch which may be a conventional type single revolution clutch and momentarily removing a stop finger 339 from engagement with the clutch 338 allows pawls within the clutch to engage each other and cause one revolution of the clutch. The pawls then engage the stop finger 339 and are caused to be disengaged from each other, thereby stopping operation of the clutch 338. As shown in Fig. 15, the stop finger 339 is pivotally mounted to a portion of the frame of the doming, crimping and bale tieing machine, as indicated at 341 and is removed from engagement with the pawls of the clutch 338 by means of a solenoid 342 which may be momentarily energized, as more fully described hereinafter.

Actuation of the clutch 338 in turn causes the shaft 337 to revolve which, through a gear train 343, causes one revolution of a jack shaft 344 extending transversely of the doming, crimping and bale tieing machine. To positively control rotary movement of the shaft 337, a conventional solenoid-operated brake, designated generally as 345, as shown in Figs. 12 and 16, is mounted about the shaft 337 and is operated by a solenoid 346. The solenoid 346 is energized at the end of one revolution of the clutch 338 and operates to positively stop rotary movement of the shaft 337.

Rotation of the shaft 344 one revolution in turn causes rotation of a pair of vertically disposed shafts 347 and 348 by means of sets of bevel gears 351 and 352, respectively. Rotation of the shafts 347 and 348, in turn causes rotation of a pair of stub shafts 353 and 354, respectively, by means of bevel gears 355 and 356, respectively. The shafts 353 and 354 are mounted in axial alignment with one another and extend horizontally transversely of the doming, crimping and bale tieing machine above the forming die 320 while, on the other hand, the shaft 344 is mounted in spaced parallel relation with the shafts 353 and 354 below the forming die 320 while the shafts 347 and 348 are mounted on opposite sides of the forming die 320.

With reference to Figs. 12, 14, 36 and 40, rotation of shaft 354 will cause a predetermined length of wire W to be fed inwardly into the doming, crimping and bale tieing machine through the wire straightener. This is accomplished by means of a wire feed cam 357 secured to the right hand end of the shaft 354, relative to Fig. 40. The wire feed cam 357 has a cam groove 358 formed therein which engages a cam follower 359 mounted at one end of a rocker arm 361. The rocker arm is rotatably secured, as indicated at 362, to a bracket 363 extending upwardly from the frame of the doming, crimping and bale tieing machine and has a gear segment 364 formed integrally therewith at its opposite end. The gear segment 364 is mounted in engagement with a gear 365 carried by a rotatable stub shaft 366. Fixedly secured to the stub shaft 366 is a feed roll 367 which engages the upper surface of the wire W, while a pressure roll 368 mounted on a shaft 369 engages the lower surface of the wire W. A pair of gears 371 and 372 (see Fig. 37) mounted on the shafts 366 and 369, respectively, cause rotation of the pressure roll 368 during similar rotation of the feed roll 367. In order to maintain the pressure roll in pressure applying relationship with the wire W, a coil spring 373 is mounted beneath the shaft 369 in engagement with an arm 374 mounting the forward end of the shaft 369. A spherical bearing 380 carried in the frame and supporting the opposite end of the shaft 369 permits limited angular movement of the shaft with respect to the shaft 366.

As illustrated in Fig. 40, the wire feed cam 357 causes oscillation of the gear segment 364 between predetermined limit positions while remaining in engagement with the gear 365. A conventional uni-directional clutch 375 mounted intermediate the gear 365 and the shaft 366 causes rotation of the shaft 366 in the clock-wise direction only relative to Fig. 36 during movement in one direction of the gear segment 364. During movement in the other direction of the gear segment 364, the shaft 366 remains stationary. By this construction, during one revolution of the shaft 344 and a corresponding single revolution of the shaft 354, a predetermined length of wire W is fed into the doming, crimping and bale tieing machine.

After a predetermined length of wire W is fed into the doming, crimping and bale tieing machine, it is cut by means of a wire cutting blade 376, as shown on Figs. 40, 42 and 48 (Sheets 14, 18 and 20 of the drawings). The cutting blade is mounted in the machine for relative vertical movement across the surface of a guide block 377 through which the wire W is fed. The cutting blade 376 is actuated by a wire cutting cam 378 carried by and rotatable with the shaft 354. A supporting arm 379 mounted in a track 381, as illustrated in Fig. 47 (Sheet 19 of the drawings), has a cam follower 382 at the upper end thereof which is engaged within the cam track of the wire cutting cam 378. The lower end of the arm 379 is secured to the cutting blade 376. The cam track of the wire cutting cam 378 is so designed that immediately after a length of wire has been fed into the machine by the wire feeding mechanism, the wire cutting blade is caused to make one quick downward and upward movement to thereby cut the wire.

At this stage of the operation of the machine of the present invention, the cut piece of wire W rests on top of a pair of loop forming mandrels 383 and 384, respectively, about which the loops L, L in the opposite ends of the wire are formed. The wire is maintained in position on the mandrels 383 and 384 by engagement with initial loop forming dies 385 and 386. The mandrels 383 and 384 extend longitudinally of the doming, crimping and bale tieing machine in spaced parallel relation with the axis of the forming die 320 and are positioned beneath the forming die 320 at opposite sides thereof. The initial loop forming dies 385 and 386 are mounted above the mandrels 383 and 384, respectively, as illustrated in Figs. 42, 48 and 49 of the drawings, for relative movement vertically with respect to the mandrels 383 and 384. At this time, the initial loop forming dies are actuated downwardly by means of a pair of initial loop forming cams 387 and 388, respectively, which are mounted on the shafts 353 and 354, respectively. Each of the initial loop forming dies 385 and 386 are carried at the lower end of support rods 391 and 392, respectively, which in turn have cam followers 393 and 394 at the upper ends thereof engaged within cam tracks in the cams 387 and 388, respectively. The support rods 391 and 392 are secured within slides 395 and 396, respectively, as shown in Fig. 47, and during downward movement of the initial loop forming dies 385 and 386, the dies engage the wire above the mandrels 383 and 384, as shown in Fig. 49 and bend the opposite end portions of the wire downwardly about the mandrels 383 and 384. The loop forming dies are then caused to remain in this position during a portion of the remainder of the loop forming operation.

After the end portions of the wire W are bent downwardly about the mandrels 383 and 384, a pair of intermediate loop forming dies 397 and 398 mounted outwardly adjacent the mandrels 383 and 384, respectively, for horizontal movement toward and away from the mandrels are actuated inwardly toward the mandrels 383 and 384. During the inward movement, the intermediate loop forming dies engage the downwardly extending end portions of the wire and bend the same inwardly about the mandrels to the position shown in Fig. 50 of the drawings. The intermediate loop forming dies 397 and 398 are adjustably secured to the forward ends of support arms 401 and 402, respectively, and cam followers 403 and 404 carried by the rear ends of the support arms 401 and 402, respectively, are engaged within cam tracks on intermediate loop forming cams 405 and 406, respectively. The intermediate loop forming cams 405 and 406 are carried by the shafts 347 and 348, respectively, at the opposite sides of the longitudinal axis of the forming die 320 and during rotation of the shafts 347 and 348, the intermediate loop forming cams 405 and 406 actuate the intermediate loop forming dies 397 and 398 inwardly to bend the end portions of the wire inwardly about the mandrels 383 and 384. The cams 405 and 406 then maintain the intermediate loop forming dies in engagement with the wire until the completion of the formation of the loops. At this time the initial loop forming cams 387 and 388 cause the initial loop forming dies 385 and 386 to be retracted out of engagement with the wire.

Immediately after the intermediate loop forming dies reach their inner limit position in engagement with the end portions of the wire, a pair of final loop forming dies 407 and 408 are actuated upwardly into engagement with the free ends of the wire and force the free ends of the wire upwardly about the mandrels 383 and 384 to the position illustrated in Fig. 51 of the drawings. The final loop forming dies 407 and 408 are carried by supporting arms 409 and 410, respectively, mounted for vertical sliding movement beneath the mandrels 383 and 384, respectively. Cam followers 411 and 412 carried by the lower ends of the supporting rods 409 and 410, respectively, are engaged within cam tracks formed in the final loop forming cams 413 and 414, respectively. The final loop forming cams 413 and 414 are carried by the shaft 344 and are rotatable therewith. During one complete revolution of the shaft 344, the final loop forming dies are caused to be actuated upwardly to bend the ends of the wire upwardly about the mandrels 383 and 384 to a position in engagement with the rear surface of the wire as shown in Fig. 51. The dies 407 and 408 are maintained in the upper position until completion of the formation of the loops.

With reference now to Figs. 13, 42, 52 and 54, after the opposite end portions of the wires are bent upwardly about the mandrels 383 and 384 to the position shown in Fig. 51 of the drawings, a pair of loop locking dies 415 and 416 slidably mounted on the loop forming mandrels 383 and 384, respectively, for horizontal movement parallel to the axes of the mandrels 383 and 384 are actuated forwardly into engagement with the extreme end portions of the wire and bend the same horizontally over the loop portion of the wire, as illustrated in Figs. 52 and 54. Actuation of the loop locking dies 415 and 416 is effected by a pair of loop locking cams 417 and 418, respectively, carried by the shaft 344 which engage cam followers 421 and 422 carried at the lower ends of a pair of rocker arms 420 and 423, respectively, mounted for pivotal movement about a shaft 424, as illustrated in Fig. 13. The rocker arms 420 and 423 are interconnected with the loop locking dies 415 and 416, respectively, by means of connecting rods 420a and 423a, respectively (see Fig. 41).

After the extreme end portions of the wire are bent forwardly over the top of the loop sections of the wire, the loop locking dies 415 and 416 are retracted and the initial loop forming dies 385 and 386 are again actuated to their downward limit position. During this movement of the initial loop forming dies 385 and 386, a pair of lugs 427 and 428 formed integrally with the initial loop forming dies 385 and 386, respectively, engage the end portions of the wire and bend the same downwardly to complete the formation of the loop, as illustrated in Figs. 53 and 55 of the drawings. The loop locking dies 415 and 416 are then actuated inwardly and strip the loops L, L at the right and left hand sides, with respect to Fig. 57, off of the loop forming mandrels 383 and 384. The dies 415 and 416 and cams for actuating the same are so arranged that the left hand loop is forced off of the mandrel 383 prior to the stripping of the right hand loop off of the mandrel 384.

Figure 58:
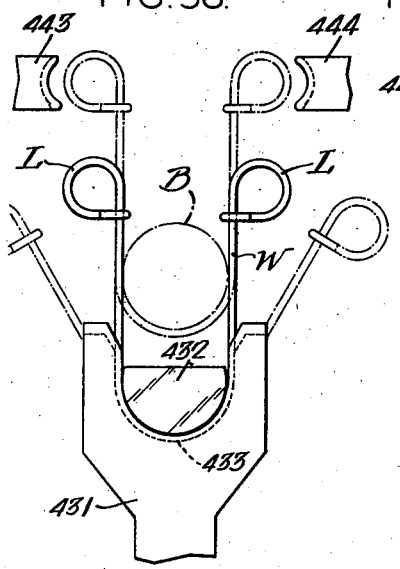

After the left hand loop is stripped off of the mandrel 383 and immediately prior to stripping the right hand loop off of the mandrel 384, a die 431 is actuated upwardly into engagement with the wire at opposite sides of a U-forming mandrel 432. The die 431 imparts an initial bend in the wire about the U-forming mandrel 432 before the right hand loop of the wire is removed from the loop forming mandrel 384. This prevents the wire from twisting about its axis after the right hand loop is removed from the loop forming mandrel 384. The die 431 then continues upwardly and bends the opposite end portions of the wire W and the loop portions L, L vertically upward about the U-forming mandrel 432. With reference to Figs. 13, 40, 42 and 47, as the die 431 is moved upwardly relative to the U-forming mandrel 432, the central portion of the wire is engaged in a slot 433 in the die 431 and the opposite end portions of the wire are bent upwardly to the vertical position, as illustrated in Fig. 58 of the drawings. The die 431 is carried by a supporting arm 434 mounted for vertical movement in a slide 435 beneath the U-forming mandrel 432 and the lower end of the connecting arm 434 carries a cam follower 436 which is engaged within the cam track of a transfer cam 437 mounted on the shaft 344. Rotation of the shaft 344 and the transfer cam 437 will initially cause the die 431 to be moved upwardly relative to the longitudinal axis of the forming die 320. When the die 431 reaches the position shown in Fig. 58 of the drawings, the U-forming mandrel is retracted and the wire remains in the position shown within the die 431. As illustrated in Fig. 13, the U-forming mandrel 432 is mounted in an opening 438 in the frame of the doming, crimping and bale tieing machine for sliding movement toward and away from the forming die 320 and the rear end of the U-forming mandrel is pivotally connected to the upper end of a rocker arm 441 as indicated at 442. The lower end of the rocker arm 441 carries a cam follower 442 which is engaged in the cam track of a U-forming mandrel cam 443 rotatable with shaft 344. The U-forming mandrel cam 443 is so designed that the U-forming mandrel 432 is caused to be retracted when the die 431 reaches the position shown in Fig. 58.

Figure 59:
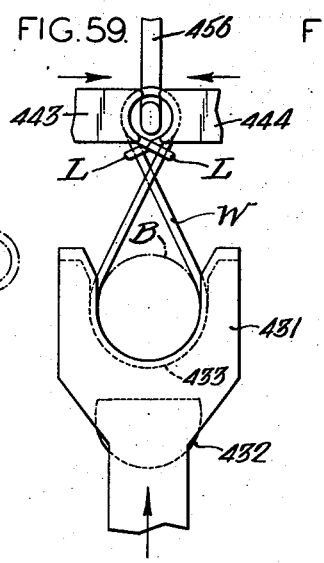

After retraction of the U-forming mandrel 432, upward movement of the die 431 is continued until the opening of the die 431 is coaxial with the forming die 320. In this position of the die 431, the central portion of the wire is positioned in engagement with the neck portion of the shell casing, as illustrated in Fig. 59 of the drawings, and the end portions and loop portions of the wire are inwardly adjacent the tube squeeze rams 322, 322. Immediately after the die 431 has reached its upper limit position shown in Fig. 59, a pair of loop aligning dies 443 and 444 mounted for horizontal movement between inner and outer limit positions at opposite sides of the wire loops L, L are actuated toward their inner limit position. The loop aligning dies 443 and 444 are carried at the forward end of connecting rods 445 and 446 mounted for sliding movement in guides 447 and 448, respectively, as illustrated in Fig. 47. The rearward ends of the connecting rods 445 and 446 are secured to crank arms 451 and 452, respectively, said arms being secured to the upper ends of a pair of vertically disposed rock shafts 449 and 450 mounted for free rotation in the frame of the machine (see Fig. 41). A second pair of arms 451a and 452a secured to the lower ends of the rock shafts carry cam followers 453 and 454, respectively, which are engaged within the cam tracks of loop aligning dies 455 and 456, respectively. The loop aligning dies 455 and 456, in turn, are fixedly secured to the shafts 347 and 348, respectively, and are rotatable therewith. During movement of the loop aligning dies 443 and 444 to their inner limit position, the dies engage the opposite loop portions L, L of the wire within slots 443a and 444a formed in the faces of the loop aligning dies 443 and 444, respectively. The face surfaces of said slots are angularly opposed to each other (see Fig. 47) and upon contact with the loops L, L act to deflect the loops laterally away from each other to the degree necessary to insure free movement to the overlying position shown in Fig. 59, wherein the loop openings are in axial alignment with one another.

After the loops of the wire are aligned by the loop aligning dies 443 and 444, a winding hook 456 is inserted through the aligned loops and rotated to twist the end of the wires together and maintain the wire in place around the neck portion of the shell casing. At the completion of the winding operation the tube squeeze rams 322, 322 are retracted by the tube squeeze cylinders, the winding hook 456 is removed from engagement with the loops, and the completed shell casing C is ejected from the doming, crimping and bale tieing machine.

With reference to Figs. 13, 14, 40 and 45, the winding hook 456 is received within the bifurcated end section of a winding shaft 458 and is pivoted thereto as indicated at 457. The winding shaft 458 is mounted for rotary and longitudinal movement in a support bracket 459 secured to the frame of the doming, crimping and bale tieing machine. The winding shaft 458 is mounted within sleeve bearings 461 and 462 supported by the support bracket 459 for rotary movement and for longitudinal movement between upper and lower limit positions. The shaft normally is maintained in its upper limit position by means of compression spring 463 having its lower end bearing against a thrust washer 464 surrounding the winding shaft in engagement with the upper end of the sleeve bearing 462. The upper end of the compression spring 463 is in engagement with a thrust bearing 465 adjustably carried by the winding shaft. The position of the thrust bearing 465 may be adjusted longitudinally of the shaft by means of a pair of adjusting nuts 466 threaded on the upper end of the shaft to obtain the desired compression in the spring 463. In the upper limit position of the winding shaft 458, a sleeve 467 fixedly secured to the winding shaft engages a thrust bearing 468 and permits the shaft to be rotated freely.

In accordance with the present invention, the winding hook 456 may readily be actuated into engagement with the aligned loops of the wire and after the wire is twisted, may be disengaged from the loops to permit the shell casings to be removed from the machine. To accomplish this, a hook actuating collar 471 is positioned about the lower end of the winding shaft 458 in engagement with a cam surface 472 formed on one side of the winding hook. The collar 471 is slidable longitudinally of the winding hook shaft 458 between upper and lower limit positions, and in the upper limit position thereof engages the upper portion of the cam surface 472 and pivots the winding hook rearwardly about its pivot point 457 out of engagement with the wire loops. During movement of the collar 471 to its lower limit position the collar engages the lower portion of the cam surface 472 and forces the winding hook forwardly to the position shown in broken lines in Fig. 45 into engagement with the wire loops.

Sliding movement of the collar 471 between its upper and lower limit positions is effected by means of a winding hook cam 483 having a cam track therein in which is engaged a cam follower 484. The cam follower 484 is carried by the upper end of a rocker arm 485 secured to a rock shaft 486 extending transversely of the doming, crimping and bale tieing machine. A second rocker arm 480 also carried by the rock shaft 486 has a pair of spaced arms 487, 487 which carry shoes 490, 490 pivotally secured to the outer extremities thereof by means of trunnions, said shoes being received within a circumferential groove 488 formed in the collar 471 and adapted to shift said collar while the shaft 458 is in motion. During one complete revolution of the shaft 353 and winding hook cam 483, the collar 471 first actuates the winding hook into engagement with the loops of the wire and after the wire is twisted actuates the winding hook 456 to a position out of engagement with the wire loops.

Rotary movement of the winding hook and winding hook shaft after the hook engages the wire loops is caused by a pneumatic cylinder 491 which has the forward end of its piston rod 492 secured to a connecting link 493. The connecting link is adjustably secured, as indicated at 494, to a rocker arm 495 carried by a vertically extending shaft 496. Formed integrally with the rocker arm 495 is a gear segment 497 which is mounted in engagement with a spur gear 498. As shown in Fig. 13, the spur gear 498 is secured to a vertically extending stub shaft 499 which carries at the lower end thereof a second gear 501 mounted in engagement with a gear 502 formed integrally with the winding hook shaft 458. When air under pressure is admitted to the rear end of the cylinder 491, the gear segment 497 is caused to rotate a predetermined number of turns in the counter clock-wise direction relative to Fig. 14, thereby causing rotation of the winding hook shaft. When air under pressure is admitted to the forward end of the cylinder 491, the gear segment 497 rotates in a clockwise direction relative to Fig. 14 also causing rotation of the winding hook shaft. By varying the point at which the connecting link 493 is secured to the rocker arm 495 by means of the adjustable connection 494, the amount of rotation of the gear segment may be varied, thereby controlling the number of revolutions made by the winding hook shaft 458 during each actuation of the winding cylinder 491.

Figure 60:
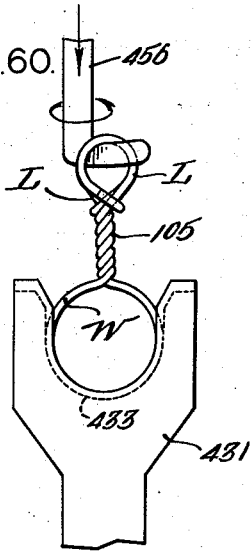

After the winding hook cam 483 actuates the winding hook to its forward limit position into engagement with the wire loops, the winding cylinder 491 is actuated causing the winding shaft to revolve a predetermined number of turns thereby twisting the wire, as illustrated in Fig. 60 of the drawings. The winding hook is then removed from the wire loops and the completed shell casing is ejected from the machine.

After the winding hook 456 is retracted from the loops of wire, an ejector 503, mounted at the forward end of the piston rod 504 of an ejection cylinder 505, as illustrated in Fig. 13, is actuated forwardly into engagement with the forward end of the completed shell casing C. The ejector 503 forces the shell casing rearwardly out of the forming die 320 and onto the transfer table 250. The ejector 503 is positioned coaxially with the forming die 320 and is adapted to be extended longitudinally through the center of the forming die 320. Control means, more fully described hereinafter, are provided to admit air under pressure to the rear end of the ejector cylinder 505 and force the ejector forwardly after retraction of the winding hook 456, and immediately thereafter admit air under pressure to the forward end of the ejector cylinder to thereby retract the ejector.

As previously set forth, the apparatus of the present invention is designed to form three separate types of shell casings C, D and E. The apparatus has been described above in connection with the formation of the shell casing C, as illustrated in Fig. 3 of the drawings. In order to form the shell casing D which has a conical open end thereon, a mandrel is secured to the forward end of the ejector, as illustrated in broken lines in Fig. 4, and extends forwardly into the opening of the forming die 320. The conical end of the tubing is formed about the mandrel thereby providing the central opening in the shell casing. In order to form the flat open end shell casing E, as shown in Fig. 5 of the drawings, the forming head 316a, as shown in Fig. 35 (Sheet 12 of the drawings), is secured to the forward end of the ram 310 and a forming die is used which will bend the forward end of the tubing inwardly over the forming head 316a. After the forward end of the tubing is bent or folded about the forming head 316a, the ejector is actuated forwardly to press the tubing in place and then the ram 310 is retracted and the ejector cylinder is actuated further forwardly to eject the finished shell casing E from the crimping, doming and bale tieing machine. When forming the shell casing E, the drive mechanism for the wire feeding and wire tieing apparatus is disconnected.

With reference now to Fig. 10 of the drawings, after actuation of the ejector and ejection cylinder, the finished shell casing rests in position on the transfer table 250. During actuation of the cleat conveyors 264 and 265 to bring a new piece of cut tubing B to a position in axial alignment with the forming die, the cleats of the cleat conveyors engage the finished shell casing and move the same laterally of the machine thereby dropping the finished shell casings off of the transfer table onto a continuously traveling discharge conveyor 506 extending transversely of the two doming, crimping and bale tieing machines beneath the transfer table 250. This discharge conveyor 506 receives the finished shell casings and transports them to a storage bin or some further apparatus (not shown).

Fig. 61 of the drawings is a cam diagram and illustrates when each of the various operations of the doming, crimping and bale tieing machine takes place relative to the other operations, and illustrates the various steps which take place during one complete cycle of operation of the machine.

Fig. 63 is a schematic, electrical and pneumatic diagram illustrating the control mechanism for one of the doming, crimping and bale tieing machines and the portion of the transfer section associated therewith. The control mechanism of the other doming, crimping and bale tieing machine and its associated transfer mechanism is exactly the same as the one illustrated and is actuated alternately with the one illustrated by means of the distributing switch 253. The various switches and cams are shown in the position they assume at the start of one complete cycle of operation.

When a piece of cut tubing B is dropped onto the transfer table it engages the distributing switch 253 and actuates the switch to a position to complete a circuit through the switch contact 510 to the control mechanism for the first doming, crimping and bale tieing machine and associated transfer mechanism described above. In a similar manner, the next time the distributing switch 253 is engaged by a piece of tubing, a circuit is completed through the contact 511 to the other doming, crimping and bale tieing machine and its associated transfer mechanism.

Upon completion of a circuit through the contact 510, a circuit is completed to the solenoid 512 of a relay 513, energizing the relay 513 and completing circuits through the relay contacts 514, 514 and 515, 515. Two series of timing cams are provided in the control mechanism of the present invention. The first series of timing cams 516, 517 and 518 are caused to make one complete revolution when the single revolution clutch 276 is actuated and are carried by the shaft 282 in a switch box 519, as illustrated in Fig. 17. The second series of timing cams 520, 521, 522 and 523 are carried by the shaft 353 in a switch box 524, as illustrated in Fig. 40 and are caused to make one complete revolution during each actuation of the clutch 338.

Referring now to Fig. 63, the circuit for the relay 513 is from one side of the line 525, through the distributing switch contact 510, through a safety switch 526 actuated by the timing cam 516, through a normally open limit switch 527 maintained in the closed position when the ram 310 is at its rearward limit position, through a safety switch 528 controlled by the timing cam 520, through the solenoid 512 of the relay 513, and then through the lead 531 to the other side of the line 532. The circuit will not be completed, and the machine will not start operating unless the various elements are in their proper position, with the ram in its rearward limit position, and the safety switches 526 and 528 closed, indicating that the clutches 276 and 338 are in their proper position.

The holding circuit for the relay 513 is through a lead from one side of the line 525, the switch 533 controlled by the timing cam 518, the relay contacts 514, 514, through the solenoid 512, and the lead 531 to the other side of the line 532.

Upon energization of the relay 513 a circuit is completed through the solenoid 279 of the single revolution clutch 276 thereby permitting the single revolution clutch 276 to make one complete revolution. The circuit for the solenoid 279 is from one side of the line 532, through the solenoid 279, through the relay contacts 515, 515, and then through a lead 534 to the other side of the line 525. This causes the cleat conveyor to start bringing a new tube into position and to remove the finished shell casing from position on the transfer table after ejection from the doming, crimping and bale tieing machine. Simultaneously with actuation of the single revolution clutch 276, a circuit is completed through the solenoid 535 of a four-way valve 536 causing the valve 536 to be moved to the right with respect to Fig. 63. This permits air under pressure to be admitted to the top of the cylinder 304, thereby retracting the stops 299 and permitting the finished shell casing to be removed from the transfer table. The circuit for the solenoid 535 of the four-way valve 536 is completed from one side of the line 525, through the lead 534, through the relay contacts 515, 515, through the solenoid 535, and then through a lead to the other side of the line 532.

At approximately one-half of a revolution of the single revolution clutch 276, a switch operating lug on the timing cam 518 engages and momentarily opens the switch 533. This breaks the holding circuit for the relay 513 permitting the relay 513 to be deenergized. Upon deenergization of the relay 513, the circuit to the solenoid 535 of the four-way valve 536 is broken, thereby causing the valve to be moved to the left with respect to Fig. 63 admitting air under pressure to the bottom of the cylinder 304 and raising the stops to properly position the next piece of tubing being moved along the transfer table by the cleat conveyor. After the circuit is broken through the relay 513, the clutch 276 continues operating until the stop finger 277 engages the pawls of the clutch and stops the clutch. This does not happen until the clutch makes one complete revolution.

When the clutch has almost completed one complete revolution, the timing cam 517 causes a switch 537 to be momentarily closed. This completes a circuit to the solenoid 538 of a relay 539 and energizes the relay, causing circuits to be completed through two sets of relay contacts 541, 541 and 542, 542. The holding circuit for the relay 539 is from one side of the line 525, through the lead 534, the relay contacts 541, 541, through a time delay switch 543, through the solenoid 538, and then through the lead 531 to the other side of the line 532.

Upon energization of the relay 539, a circuit is completed through the solenoid 544 of a four-way valve 555, causing the valve element to be moved to the left with respect to Fig. 63, thereby admitting air under pressure to the rear end of the ram cylinder 312. The circuit through the solenoid 544 is from one side of the line 532, through the solenoid 544, through the lower contact 542, 542 of the relay 539, and then through the lead 534 to the other side of the line 525. After air under pressure is admitted to the rear end of the ram cylinder 312, the ram 310 is actuated in the forward direction. By the time the ram 310 has reached the transfer table, the cleat conveyor has positioned a cut piece of tubing B against the stop members and the single revolution clutch 276 has completed one revolution. The ram 310 then enters the cut piece of tubing and during movement to its forward limit position forces the cut piece of tubing into position as described previously, in the doming, crimping and bale tieing machine. When the ram 310 reaches its forward limit position, a limit switch 547 is engaged and actuated, thereby completing a circuit through the contact 548 of the limit switch 547 and breaking a circuit through the contact 549 of the limit switch 547. This breaks the circuit for the solenoid 551 of the time delay switch 543 which formerly was completed from one side of the line 532, through the lead 552, through the solenoid 551, through a lead 553, through the contact 549 of the limit switch 547, and then through a lead 554 to the other side of the line 525. After a predetermined length of time, the time delay switch is opened, thereby breaking the holding circuit for the relay 539 and actuating the valve 545 to its right hand position, causing air under pressure to be admitted to the forward end of the ram cylinder 312 and retracting the ram. The time delay switch 543 is so designed, however, that the ram is not retracted until after the squeeze rams 322, 322 have engaged the neck portion of the shell casing and a portion of the wire forming operations have been completed.

When the circuit is completed through the contact 548 of the limit switch 457, solenoid 342 of the single revolution clutch 338 is energized. The circuit for the solenoid 314 is completed from one side of the line 525, through the lead 554, through the switch contact 548, to the solenoid 342 of the single revolution clutch 338, through the lead 552, to the other side of the line 532. Upon completion of a circuit through the solenoid of the single revolution clutch 338, the clutch begins to make one revolution, and the timing cams 521, 522 and 523 each make one revolution. At the beginning of the rotation of the timing cams 521, 522 and 523, the safety switch 528 is opened, so that machine cycle may not start until the clutch 338 has finished one complete revolution. Immediately after this, the timing cam 523 engages a switch 555 and completes a circuit through the solenoid 556 of a four-way valve 557. This actuates the valve element to the right with respect to Fig. 63 and causes air under pressure to be admitted to the rear end of the squeeze ram cylinders 325, 325 forcing the squeeze rams 322, 322 forward into engagement with neck of the shell casing. The single revolution clutch 338 also drives the various cam members which cause the wire forming operation to take place. After the wire has been completely formed and the loops aligned and the wire winding hook inserted through the loops, the timing cam 521 engages and momentarily closes a switch 559. This momentarily energizes the solenoid 561 at the left hand end of a four-way valve 562 moving the valve element to the right with respect to Fig. 63, thereby causing air under pressure to be admitted to the right hand end of the wire winding cylinder 491. The wire winding cylinder 591 then makes one stroke to the left, thereby twisting the hook and winding the wire. The circuit for the solenoid 561 of the four-way valve 562 goes from one side of the line 525, through the switch 559, through a lead 563, a selector switch 564, through a lead 565, and then through the solenoid 561 and through a lead 566 to the other side of the line 532. When the valve element of the four-way valve 562 is moved to the right, the position of the selector switch is changed, so that the next time a circuit is completed through the switch 559, the solenoid 567 at the right hand of the four-way valve 562 is energized, thereby causing the wire winding cylinder to make its next stroke in the opposite direction.

During the time, the time delay switch 543 is opened causing the ram 310 to be moved to its rearward position and deenergizing the solenoid 342 of the single revolution clutch 338.

Upon continued rotation, however, of the single revolution clutch, the time cam 523 opens the switch 555 deenergizing the circuit to the solenoid 556 of the four-way valve 557, thereby admitting air under pressure to the forward ends of the squeeze ram cylinders 325, 325 and retracting the rams 322, 322 from engagement with the neck of the shell casing.

Still further rotation of the single revolution clutch causes the timing cam 522 to momentarily actuate a switch 568 to the closed position, thereby momentarily completing a circuit through the solenoid 569 of a four-way valve 571. Completion of the circuit through the solenoid 569 is from one side of the line 525, through the switch 568, through a lead 572, through the solenoid 569, and then through a lead 573, and the lead 566, to the other side of the line 532. Upon completion of the circuit through the solenoid 569 of the four-way valve 571, the valve element is moved to the right with respect to Fig. 63, thereby permitting fluid under pressure to be admitted to the rear end of the ejector cylinder 505. This forces the ejector forwardly into engagement with the completed shell casing and ejects the completed shell casing from the doming, crimping and bale tieing machine. Further revolution of the timing cam 522 opens the switch 568, thereby deenergizing the solenoid 569 and causing fluid under pressure to be admitted to the forward end of the ejector cylinder 505 and retracting the ejector. At this point the single revolution clutch 338 has completed one full revolution and stops, thereby leaving all of the elements of the machine in the position shown in Fig. 63 and ready for a second cycle of operation.

From the foregoing, it is apparent that the present invention provides novel apparatus for making and closing dynamite shell cartridges and casings and similar equipment automatically which will form a continuous cylindrical shell, cut the same into predetermined lengths and then form closed ends on the cut length of tubing automatically to completely manufacture shell casings in one continuous operation without any intermediate manual handling of the shell casing.

While particular embodiments of the present invention have been illustrated and described herein, it is not intended to limit the invention to such a disclosure and changes and modifications may be incorporated and embodied therein within the scope of the following claims.

We claim:

1. Apparatus for forming cylindrical shell casings and the like comprising; means to feed a continuous length of cylindrical tubing along a predetermined path longitudinally of said apparatus, cutting mechanism positioned adjacent said predetermined path operable to engage and cut said continuous length of tubing into predetermined lengths, transfer mechanism positioned adjacent said cutting mechanism operable to receive said cut lengths of tubing and convey the same alternately to opposite sides of said apparatus laterally away from said predetermined path, and one crimping mechanism at each side of said predetermined path, each of said crimping mechanisms operable to receive said cut lengths of tubing from said transfer mechanism and crimp one end of said tubing inwardly to form said shell casing.

2. Apparatus for forming cylindrical shell casings and the like comprising; means to feed a continuous length of cylindrical tubing along a predetermined path longitudinally of said apparatus, cutting mechanism positioned adjacent predetermined path operable to engage and cut said continuous length of tubing into predetermined lengths, transfer mechanism positioned adjacent said cutting mechanism operable to receive said cut lengths of tubing and convey the same alternately to opposite sides of said apparatus laterally away from said predetermined path, one crimping mechanism at each side of said predetermined path, each of said crimping mechanisms operable to receive said cut lengths of tubing from said transfer mechanism and crimp one end of said tubing inwardly to form said shell casing, and wire forming and tieing mechanism associated with each crimping mechanism operable to position a piece of wire about the crimped end of said shell casings and twist the wire to maintain the wire in position around the end of said shell casing.

3. Apparatus for forming cylindrical shell casings and the like comprising; tube forming mechanism operable to form a continuous length of cylindrical tubing, a mandrel extending longitudinally of said apparatus on which said tubing is formed, cutting mechanism positioned adjacent one end of said mandrel operable to engage and cut said continuous length of tubing into predetermined lengths, transfer mechanism positioned adjacent said cutting mechanism operable to receive said cut lengths of tubing and convey the same alternately to opposite sides of said apparatus laterally away from said mandrel, and crimping mechanism positioned at opposite sides of said cutting mechanism operable to receive the cut lengths of tubing from said transfer mechanism, each of said crimping mechanisms operable to crimp one end of said cut pieces of tubing inwardly to form said shell casings.

4. Apparatus for forming cylindrical shell casings and the like comprising; tube forming mechanism operable to form a continuous length of cylindrical tubing and feed the tubing along a predetermined path longitudinally of said apparatus on which said tubing is formed, cutting mechanism positioned adjacent said predetermined path operable to engage and cut said continuous length of tubing into predetermined lengths, transfer mechanism positioned adjacent said cutting mechanism operable to receive said cut lengths of tubing and convey the same alternately to opposite sides of said apparatus laterally away from said cutting mechanism, crimping mechanism positioned at opposite sides of said cutting mechanism operable to receive the cut lengths of tubing from said transfer mechanism, each of said crimping mechanisms operable to crimp one end of said tubing inwardly to form said shell casing, and wire forming and tieing mechanism associated with each of said crimping mechanisms operable to position a piece of wire about the shaped end of said shell casing and twist the wire to maintain the wire in position around the end of said shell casing.

5. Apparatus for forming cylindrical shell casings and the like comprising; tube forming mechanism operable to form a continuous length of cylindrical tubing and feed the same longitudinally of said apparatus on which said tubing is formed, a target plate mounted in axial alignment with said tubing operable to be engaged thereby, a continuously rotating saw blade mounted transversely of the longitudinal axis of said tubing, control means actuatable upon engagement of said target by said tubing to move said saw blade longitudinally with said tubing at the same rate of speed as the feed of said tubing and move said saw blade into engagement with said tubing to cut the same, a transfer table positioned beneath said saw blade onto which said cut tubing is dropped, a pressure actuated distributing switch mounted on said transfer table, said switch actuatable upon engagement by tubing dropped on said transfer table, transfer means carried by said transfer table operable upon actuation of said distributing switch to convey the tubing deposited on said transfer table away from said saw blade and crimping mechanism operable to receive said cut lengths of tubing from said conveyor means and crimp one end of said tubing inwardly to form said shell casing, and means to actuate said crimping mechanism in response to action by said transfer means.

6. Apparatus for forming cylindrical shell casings and the like comprising; a tube forming machine operable to form a continuous length of cylindrical tubing, cutting mechanism positioned adjacent said tube forming apparatus operable to engage and cut said continuous length of tubing into predetermined lengths, transfer mechanism to receive said cut lengths of tubing and convey the same away from said cutting mechanism, crimping mechanism operable to receive said cut lengths of tubing from said transfer mechanism and crimp one end of said tubing inwardly to form said shell casing, wire feed mechanism associated with said crimping mechanism operable to feed a predetermined length of wire into said crimping mechanism, forming means operable to form loops at the opposite ends of said wire, wire bending and transfer mechanism operable to engage opposite end portions of said loops and bend the wire and thereafter position the wire about the crimped end of said tubing, and means to engage the loops at the opposite ends of said wire and rotate said loops a predetermined number of turns to thereby twist the ends of said wire together and maintain the wire in position about the crimped end of said tubing.

7. Apparatus for forming cylindrical shell casings and the like comprising; tube forming mechanism operable to form a continuous length of cylindrical tubing and feed the same longitudinally of said apparatus on which said tubing is formed, a target plate mounted in axial alignment with said tubing operable to be engaged thereby, a continuously rotating saw blade mounted transversely of the longitudinal axis of said tubing, control means actuatable upon engagement of said target by said tubing to move said saw blade longitudinally with said tubing at the same rate of speed as the feed of said tubing and move said saw blade into engagement with said tubing to cut the same, a transfer table positioned beneath said saw blade on which said cut tubing is deposited, a pressure actuated distributing switch mounted on said transfer table, said switch actuatable upon engagement by tubing deposited on said transfer table, conveyor means carried by said transfer table operable upon actuation of said distributing switch to convey the tubing deposited on said transfer table away from said saw blade, crimping mechanism operable to receive said cut lengths of tubing from said conveyor means and crimp one end of said tubing inwardly to form said shell casing, wire feed mechanism associated with said crimping mechanism operable to feed a predetermined length of wire into said crimping mechanism, forming means operable to form loops at the opposite ends of said wire, wire bending and transfer mechanism operable to engage opposite end portions of said loops and bend the wire and thereafter position the wire about the crimped end of said tubing, and means to engage the loops at the opposite ends of said wire and rotate said loops a predetermined number of turns to thereby twist the ends of said wire together and maintain the wire in position about the crimped end of said tubing.

8. In a machine for forming cylindrical shell casings and similar apparatus including cutting means for cutting a continuous length of tubing into predetermined lengths comprising; feed means to feed said continuous length of tubing forwardly and rotate the same, a target plate mounted in axial alignment with said tubing operable to be engaged by said tubing, a continuously rotating saw blade mounted transversely of the longitudinal axis of said tubing and mounted for movement between a forward limit position in engagement with said tubing and a retracted limit position out of engagement with said tubing, a piston mounted for relative movement longitudinally with respect to said tubing, drive means to actuate the piston back and forth between rearward and forward limit positions, means interconnecting said piston, target plate, and saw blade for movement with one another, normally closed valve means which opens in response to the amount of pressure on said target by said tubing, said valve means controlling pressure of hydraulic fluid on said piston to move said piston to its forward limit position at the same speed as the feed of said tubing and cotrol mechanism thereafter to actuate said saw blade to its forward limit position into engagement with the tubing to cut the same.

9. In a machine for forming cylindrical shell casings and similar apparatus including cutting means for cutting a continuous length of tubing into predetermined lengths comprising; feed means to feed said continuous length of tubing forwardly and rotate the same, a target plate mounted in axial alignment with said tubing operable to be engaged by said tubing, a continuously rotating saw blade mounted transversely of the longitudinal axis of said tubing, drive means for said saw blade, saw blade actuating means connected to said saw blade operable to move said saw blade transversely relative to the axis of said tubing into engagement with said tubing to cut the same, a piston mounted for relative movement longitudinally of said tubing, drive means to actuate said piston back and forth between rearward and forward limit positions, means interconnecting said piston, target plate, and saw blade for movement with one another, normally closed valve means which opens in response to the amount of pressure on said target by said tubing, said valve means controlling pressure of hydraulic fluid on said piston to move said piston to its forward limit position at the same speed as the feed of said tubing and control mechanism thereafter to actuate said saw blade actuating means.

10. In a machine for forming cylindrical shell casings and similar apparatus including cutting means for cutting a continuous length of tubing into predetermined lengths comprising; feed means to feed said continuous length of tubing forwardly and rotate the same, a target plate mounted in axial alignment with said tubing operable to be engaged by said tubing, a continuously rotating saw blade mounted transversely of the longitudinal axis of said tubing, drive means for said saw blade, saw blade actuating means connected to said saw blade operable to move said saw blade transversely relative to the axis of said tubing into engagement with said tubing to cut the same, a piston mounted for relative movement longitudinally of said tubing, drive means to actuate said piston back and forth between rearward and forward limit positions, means interconnecting said piston, target plate, normally closed valve means which opens in response to the amount of pressure on said target by said tubing, said valve means controlling pressure of hydraulic fluid on said piston to move said piston towards its forward limit position at the same speed as the feed of said tubing, control means actuatable during forward movement of said piston to actuate said saw blade actuating means and cause said saw blade to engage and cut said tubing, and switch means operable during forward movement of said piston to actuate said saw blade actuating means in the opposite direction after said tubing is cut and thereafter actuate said piston mechanism to move said piston to its rearward limit position.

11. In a machine for forming cylindrical shell casings and similar apparatus including cutting means for cutting a continuous length of tubing into predetermined lengths comprising; feed means to feed said continuous length of tubing forwardly and rotate the same, a target plate mounted in axial alignment with said tubing operable to be engaged by said tubing, a continuously rotating saw blade mounted transversely of the longitudinal axis of said tubing, drive means for said saw blade, saw blade actuating means connected to said saw blade operable to move said saw blade transversely relative to the axis of said tubing into engagement with said tubing to cut the same, a piston mounted for relative movement longitudinally of said tubing, drive means to actuate said piston back and forth between rearward and forward limit positions, means interconnecting said piston, target plate, and saw blade for movement for one another, normally closed valve means which opens in response to the amount of pressure on said target by said tubing, said valve means controlling pressure of hydraulic fluid on said piston to move said piston toward its forward limit position at the same speed as the feed of said tubing, control means actuatable during forward movement of said piston to actuate said saw blade actuating means and cause said saw blade to engage and cut said tubing, and switch means operable during forward movement of said piston to actuate said saw blade actuating means in the opposite direction after said tubing is cut and thereafter actuate said piston in the opposite direction and move said piston to its rearward limit position.

12. In a machine for forming cylindrical shell casings and similar apparatus including cutting means for cutting a continuous length of tubing into predetermined lengths comprising; feed means to feed said continuous length of tubing forwardly and rotate the same, a target plate mounted in axial alignment with said tubing operable to be engaged by said tubing, a continuously rotating saw blade mounted transversely of the longitudinal axis of said tubing, drive means for said saw blade, saw blade actuating means connected to said saw blade operable to move said saw blade transversely relative to the axis of said tubing into engagement with said tubing to cut the same, a piston mounted for relative movement longitudinally of said tubing, drive means to actuate said piston back and forth between rearward and forward limit positions, means interconnecting said piston, target plate, and saw blade for movement with one another, adjustable mounting means for said saw blade adjustably securing said saw blade to said interconnecting means to permit the distance between said saw blade and said target to be varied between predetermined limit positions, normally closed valve means which opens in response to the amount of pressure on said target by said tubing, said valve means controlling pressure of hydraulic fluid on said piston to move said piston toward its forward limit position at the same speed as the feed of said tubing, control means actuatable during forward movement of said piston to actuate said saw blade actuating means and cause said saw blade to engage and cut said tubing, and switch means operable during forward movement of said piston to actuate said saw blade actuating means in the opposite direction after said tubing is cut and thereafter actuate said piston in the opposite direction and move said piston to its rearward limit position.

13. In apparatus for forming cylindrical shell casings and the like including mechanism to form tubing of predetermined dimensions and a pair of crimping mechanisms to receive said tubing and crimp one end thereof inwardly to form the shell casings, a transfer table on which said tubing is deposited by said tube forming means, a pair of cleat conveyors carried by said transfer table operable to engage said tubing and convey the same laterally of said transfer table, one of said conveyors operable to engage said tubing and move the same into a position in axial alignment with one of said crimping mechanisms, the other said conveyor operable to engage said tubing and move the same to position in axial alignment with the other of said crimping mechanisms, and control means operatively associated with said cleat conveyors operable to actuate said cleat conveyors alternately.

14. Apparatus as claimed in claim 13 including; a ram associated with each of said crimping mechanisms mounted for longitudinal movement between rearward and forward limit positions and operable during movement to their forward limit positions to be engaged within a piece of tubing positioned by said cleat conveyors in axial alignment with said crimping mechanisms and move said tubing longitudinally forward into engagement with said crimping mechanisms, and control mechanism operatively associated with said cleat conveyors and said rams operable in a predetermined position of said cleat conveyors to actuate said rams towards said forward limit positions.

15. In apparatus for forming cylindrical shell casings and the like including mechanism to form tubing of predetermined dimensions and a pair of crimping mechanisms to receive said tubing and crimp one end thereof inwardly to form the shell casings, a transfer table on which said tubing is deposited, a pair of cleat conveyors carried by said transfer table operable to engage said tubing and convey the same laterally of said transfer table, one of said conveyors operable to engage said tubing and move the same into a position in axial alignment with one of said crimping mechanisms, the other of said conveyors operable to engage said tubing and move the same into position in axial alignment with the other of said crimping mechanisms, intermittent drive means carried by said table operatively connected with each of said cleat conveyors and operable to drive the same intermittently, and control means operatively associated with said drive means operable to actuate said drive means alternately and thereby actuate said cleat conveyors alternately.

16. In apparatus for forming cylindrical shell casings and the like including mechanism to form tubing of predetermined dimensions and a pair of crimping mechanisms to receive said tubing and crimp one end thereof inwardly to form the shell casings, a transfer table on which said tubing is deposited, a pressure actuated distributing switch mounted centrally of said table for engagement by said tubing when said tubing is deposited on said table, a pair of cleat conveyors carried by said transfer table operable to engage said tubing and convey the same laterally of said transfer table, one of said conveyors operable to engage said tubing and move the same into a position in axial alignment with one of said crimping mechanisms, the other of said conveyors operable to engage said tubing and move the same into position in axial alignment with the other of said crimping mechanisms, intermittent drive means carried by said table operatively connected with each of said cleat conveyors and operable to drive the same intermittently, control means operatively associated with said drive means operable to actuate said drive means alternately and thereby actuate said cleat conveyors alternately, and an electric circuit including said control means and said distributing switch operable each time said distributing switch is engaged by a piece of tubing deposited on said table to actuate said control means to cause movement of one of said cleat conveyors.

17. In apparatus for forming cylindrical shell casings and the like including mechanism to form tubing of predetermined dimensions and a pair of crimping mechanisms to receive said tubing and crimp one end thereof inwardly to form the shell casings, a transfer table on which said tubing is deposited, a pressure actuated distributing switch mounted centrally of said table for engagement by said tubing when said tubing is deposited on said table, a pair of cleat conveyors carried by said transfer table operable to engage said tubing and convey the same laterally of said transfer table, one of said conveyors operable to engage said tubing and move the same into a position in axial alignment with one of said crimping mechanisms, the other of said conveyors operable to engage said tubing and move the same into position in axial alignment with the other of said crimping mechanisms, intermittent drive means carried by said table operatively connected with each of said cleat conveyors and operable to drive the same intermittently, control means operatively associated with said drive means operable to actuate said drive means alternately and thereby actuate said cleat conveyors alternately, an electric circuit including said control means and said distributing switch operable each time said distributing switch is engaged by a piece of tubing deposited on said table to actuate said control means to cause movement of one of said cleat conveyors, and means adjustably mounted on said transfer table for adjusting movement between upper and lower limit positions to adjust the position of said transfer table relative to the longitudinal axis of said crimping mechanisms.

18. Apparatus as claimed in claim 17 including; a ram associated with each of said crimping mechanisms mounted for longitudinal movement between rearward and forward limit positions and operable during movement to their forward limit positions to be engaged within a piece of tubing positioned by said cleat conveyors in axial alignment with said crimping mechanisms and move said tubing longitudinally forward into engagement with said crimping mechanisms, and control mechanism operatively associated with said cleat conveyors and said rams operable in a predetermined position of said cleat conveyors to actuate said rams towards said forward limit positions.

19. In apparatus for forming cylindrical shell casings including tube forming mechanism for forming cylindrical tubes and transfer mechanism to receive and convey the tubes, shell casing forming mechanism comprising; feed means to receive said tubes from said transfer mechanism and insert the same into said forming mechanism, a forming die mounted within said forming mechanism operable to engage and crimp one end of said tube inwardly, wire feed mechanism operable to feed a predetermined length of wire into said machine transversely of the longitudinal axis of said tube a predetermined distance therefrom, forming means operable to form loops in the opposite end portions of said wire, wire positioning means operable to position said wire about said one end of said tube with the loops in the opposite end portions of said wire in axial alignment with one another, and means mounted rearwardly adjacent said forming die operable after said loops are in axial alignment with one another to engage said loops and twist the opposite end portions of said wire together.

20. In apparatus for forming cylindrical shell casings including tube forming mechanism for forming cylindrical tubes and transfer mechanism to receive and convey the tubes, shell casing forming mechanism comprising; feed means to receive said tubes from said transfer mechanism and insert the same into said forming mechanism, a forming die mounted within said forming mechanism operable to engage and crimp one end of said tube inwardly, wire feed mechanism operable to feed a predetermined length of wire into said machine transversely of the longitudinal axis of said tube a predetermined distance therefrom, forming means operable to form loops in the opposite end portions of said wire, wire positioning means operable to position said wire about said one end of said tube with the loops in the opposite end portions of said wire in axial alignment with one another, a retractable hook mounted rearwardly adjacent said forming die actuatable to a forward limit position into engagement with said loops, and drive means for said hook operable to rotate said hook when said hook is in engagement with said loops a predetermined number of turns to thereby twist the end portions of said wire together.

21. In apparatus for forming cylindrical shell casings including tube forming mechanism for forming cylindrical tubes and transfer mechanism to receive and convey the tubes, shell casing forming mechanism comprising; feed means to receive said tubes from said transfer mechanism and insert the same into said forming mechanism, a forming die mounted within said forming mechanism operable to engage and crimp one end of said tube inwardly, wire feed mechanism operable to feed a predetermined length of wire into said machine transversely of the longitudinal axis of said tube a predetermined distance therefrom, forming means operable to form loops in the opposite end portions of said wire, wire positioning means operable to position said wire about said one end of said tube with the loops in the opposite end portions of said wire in axial alignment with one another, a retractable hook mounted rearwardly adjacent said forming die actuatable between forward and rearward limit positions and operable in its forward limit position to be engaged within said aligned loops, drive means for said hook operable to rotate said hook when said hook is in engagement with said loops a predetermined number of turns to thereby twist the ends of said wires together, and means to actuate said hook to its forward limit position after said loops are aligned and to its rearward limit position after rotation of said hook.

22. In apparatus for forming cylindrical shell casings including tube forming mechanism for forming cylindrical tubes and transfer mechanism to receive and convey the tubes, shell casing forming mechanism comprising; feed means to receive said tubes from said transfer mechanism and insert the same into said forming mechanism, a forming die mounted within said forming mechanism operable to engage and crimp one end of said tube inwardly, wire feed mechanism operable to feed a predetermined length of wire into said machine transversely of the longitudinal axis of said tube a predetermined distance therefrom, forming means operable to form loops in the opposite end portions of said wire, wire positioning means operable to position said wire about said one end of said tube with the loops in the opposite end portions of said wire in axial alignment with one another, a retractable hook mounted rearwardly adjacent said forming die actuatable between forward and rearward limit positions and operable in its forward limit position to be engaged within said aligned loops, drive means for said hook operable to rotate said hook when said hook is in engagement with said loops a predetermined number of turns to thereby twist the ends of said wires together, and means to actuate said hook to its forward limit position after said loops are aligned and to its rearward limit position after rotation of said hook, and ejector means mounted rearwardly of said forming die in axial alignment therewith and actuable after retraction of said hook to its rearward limit position to engage said tubing to force the same out of said forming die.

23. In apparatus for forming cylindrical shell casings including tube forming mechanism for forming cylindrical tubes and transfer mechanism to receive and convey the tubes, shell casing forming mechanism comprising; feed means to receive said tubes from said transfer mechanism and insert the same into said forming mechanism, a forming die mounted within said forming mechanism operable to engage and crimp one end of said tube inwardly, wire feed mechanism operable to feed a predetermined length of wire into said machine transversely of the longitudinal axis of said tube a predetermined distance therefrom, forming means operable to form loops in the opposite end portions of said wire, wire bending and transfer mechanism operable to engage opposite end portions of said wire and bend the wire and thereafter position the wire about said one end of said tubing, a pair of loop aligning dies mounted rearwardly adjacent said forming die for movement laterally between forward and rearward limit positions relative to said tube, said loop aligning dies operable during movement to their inner limit position to engage said loops and place said loops in alignment with one another, and wire twisting mechanism mounted adjacent said loop aligning dies operable to engage said loops and twist the end portions of said wire together.

24. In apparatus for forming cylindrical shell casings including tube forming mechanism for forming cylindrical tubes and transfer mechanism to receive and convey the tubes, shell casing forming mechanism compris-ing; feed means to receive said tubes from said transfer mechanism and insert the same into said forming mechanism, a forming die mounted within said forming mechanism operable to engage and crimp one end of said tube inwardly, wire feed mechanism operable to feed a predetermined length of wire into said machine transversely of the longitudinal axis of said tube a predetermined distance therefrom, forming means operable to form loops in the opposite end portions of said wire, wire bending and transfer mechanism operable to engage opposite end portions of said wire and bend the wire about said one end of said tubing, a pair of loop aligning dies mounted rearwardly adjacent said forming die for movement laterally between forward and rearward limit positions relative to said tube, said loop aligning dies operable during movement to their inner limit position to engage said loops and place said loops in alignment with one another, a retractable hook mounted rearwardly adjacent said forming die actuatable between forward and rearward limit positions and operable in its forward limit position to be engaged within said aligned loops, and drive means for said hook operable to rotate said hook when said hook is in engagement with said loops a predetermined number of turns to thereby twist the ends of said wire together.

25. In apparatus for forming cylindrical shell casings including tube forming mechanism for forming cylindrical tubes and transfer mechanism to receive and convey the tubes, shell casing forming mechanism comprising; feed means to receive said tubes from said transfer mechanism and insert the same into said forming mechanism, a forming die mounted within said forming mechanism operable to engage and crimp one end of said tube inwardly, wire feed mechanism operable to feed a predetermined length of wire into said machine transversely of the longitudinal axis of said tube a predetermined distance therefrom, forming means operable to form loops in the opposite end portions of said wire, wire bending and transfer mechanism operable to engage opposite end portions of said wire and bend said wire about said one end of said tubing, a pair of loop aligning dies mounted rearwardly adjacent said forming die for movement laterally between forward and rearward limit positions relative to said tube, said loop aligning dies operable during movement to said inner limit position to engage said loops and place said loops in alignment with one another, a retractable hook mounted rearwardly adjacent said forming die actuatable between forward and rearward limit positions and operable in its forward limit position to be engaged within said aligned loops, drive means for said hook operable to rotate said hook when said hook is in engagement with said loops a predetermined number of turns to thereby twist the ends of said wire together, and means to actuate said hook to its forward limit position after said loops are aligned and to its rearward limit position after rotation of said hook.

26. In apparatus for forming cylindrical shell casings including tube forming mechanism for forming cylindrical tubes and transfer mechanism to receive and convey the tubes, shell casing forming mechanism comprising; feed means to receive said tubes from said transfer mechanism and insert the same into said forming mechanism, a forming die mounted within said forming mechanism operable to engage and crimp one end of said tube inwardly, wire feed mechanism operable to feed a predetermined length of wire into said machine transversely of the longitudinal axis of said tube a predetermined distance therefrom, forming means operable to form loops in the opposite end portions of said wire, wire bending and transfer mechanism operable to engage opposite end portions of said wire and bend said wire about said one end of said tubing; a pair of loop aligning dies mounted rearwardly adjacent said forming die for movement laterally between forward and rearward limit positions relative to said tube, said loop aligning dies operable during movement to their inner limit position to engage said loops and place said loops in alignment with one another, a retractable hook mounted rearwardly adjacent said forming die actuatable between forward and rearward limit positions and operable in its forward limit position to be engaged within said aligned loops, drive means for said hook operable to rotate said hook when said hook is in engagement with said loops a predetermined number of turns to thereby twist the ends of said wire together, means to actuate said hook to its forward limit position after said loops are aligned and to rearward limit position after rotation of said hook, and ejector means mounted rearwardly of said forming die in axial alignment therewith and actuatable after retraction of said hook to its rearward limit position to engage said tubing and force the same out of said forming die.

References Cited in the file of this patent

UNITED STATES PATENTS

| | | |
|---|---|---|
| 645,328 | Pedigo | Mar. 13, 1900 |
| 710,706 | Miller | Oct. 7, 1902 |
| 1,084,799 | Heinzen | Jan. 20, 1914 |
| 1,196,466 | Lindgren | Aug. 29, 1916 |
| 1,635,514 | Trevander | July 12, 1927 |
| 1,712,454 | Spencer | May 7, 1929 |
| 1,960,248 | Macy | May 29, 1934 |
| 2,087,490 | Voight et al. | July 20, 1937 |
| 2,230,410 | Parkhurst | Feb. 4, 1941 |
| 2,497,297 | Court | Feb. 14, 1950 |
| 2,569,850 | Falconer | Oct. 2, 1951 |
| 2,623,445 | Robinson | Dec. 30, 1952 |
| 2,639,069 | West | May 19, 1953 |
| 2,699,099 | Robinson | Jan. 11, 1955 |
| 2,769,377 | Jennings et al. | Nov. 6, 1956 |
| 2,813,614 | Dazey et al. | Nov. 19, 1957 |
| 2,828,849 | Sharpe | Apr. 1, 1958 |

FOREIGN PATENTS

| | | |
|---|---|---|
| 671,148 | Great Britain | Apr. 30, 1952 |